(12) United States Patent
Walker et al.

(10) Patent No.: US 8,626,519 B1
(45) Date of Patent: Jan. 7, 2014

(54) ENTERTAINMENT LAYER OVERLAID ON ONLINE TRANSACTIONS

(75) Inventors: Jay S. Walker, Ridgefield, CT (US); Geoffrey M. Gelman, Stamford, CT (US); Andrew P. Golden, New York, NY (US); Scott B. Allison, Stamford, CT (US)

(73) Assignee: Inventor Holdings, LLC, Stamford, CT (US)

( * ) Notice: Subject to any disclaimer, the term of this patent is extended or adjusted under 35 U.S.C. 154(b) by 844 days.

(21) Appl. No.: 09/538,773

(22) Filed: Mar. 30, 2000

(51) Int. Cl.
 *G06Q 30/00* (2012.01)

(52) U.S. Cl.
 USPC .......................................................... 705/1.1

(58) Field of Classification Search
 USPC .......................................... 705/1, 26, 1.1, 14
 See application file for complete search history.

(56) References Cited

U.S. PATENT DOCUMENTS

| | | | |
|---|---|---|---|
| 4,582,324 A | 4/1986 | Koza et al. | |
| 5,368,129 A * | 11/1994 | Von Kohorn | 186/52 |
| 5,682,469 A | 10/1997 | Linnett et al. | |
| 5,737,533 A | 4/1998 | de Hond | |
| 5,791,990 A | 8/1998 | Schroeder et al. | |
| 5,794,207 A * | 8/1998 | Walker et al. | 705/1 |
| 5,855,008 A * | 12/1998 | Goldhaber et al. | 705/10 |
| 5,950,173 A * | 9/1999 | Perkowski | 705/26 |
| 5,982,390 A | 11/1999 | Stoneking et al. | |
| 5,983,190 A | 11/1999 | Trower, II et al. | |
| 6,002,401 A | 12/1999 | Baker | |
| 6,002,853 A | 12/1999 | de Hond | |
| 6,035,288 A | 3/2000 | Solomon | |
| 6,067,570 A | 5/2000 | Kreynin et al. | 709/227 |
| 6,076,069 A * | 6/2000 | Laor | 705/14 |
| 6,401,074 B1 * | 6/2002 | Sleeper | 705/14 |
| 2002/0044103 A1 * | 4/2002 | Paulson | 345/1.1 |

OTHER PUBLICATIONS

Slot Machine 98, a freeware form Peter Nordstrom http://www.freedownloadscenter.com/Games/Casino_Games/Slot_Machine_98.html.*
Extreme Slots, a shareware from Ultisoft, Inc.*
St. Patricks Slots, a shareware from Ultisoft, Inc.*
Information on PointCast.com www.pointcast.com.*
Information on eBay.com www.ebay.com.*
Information on Media Science, Inc.'s Sonique product www.sonique.com.*
Slot Machine 98, a freeware from Peter Nordstrom, Jan. 5, 1999.*
Information on eBay Corporation, 1999.*
Information on Mediascience, Inc. Sonique, 1999.*
Information on PointCast Incorporated, 1999-2000.*
Discover Card, 1999.*
Information on International Software Value, 1997.*
Information on eBay, Inc., 1999.*
Scott Woolley, Mine Was Cheaper, Nov. 2, 1998, Forbes.com.*
Robin Taylor Parets, Priceline.com's Brave New World, Inc.com.*

(Continued)

*Primary Examiner* — Naresh Vig
(74) *Attorney, Agent, or Firm* — Fincham Downs, LLC; Carson C. K. Fincham

(57) ABSTRACT

A method and apparatus for allowing a customer to conduct or initiate a transaction for purchasing, renting, leasing, etc. a product or a service during which the customer will provide one or more transaction inputs. One or more transaction outcomes or outputs will be determined, based at least in part on or using one or more transaction inputs. The transaction outcomes are provided to the customer via an entertainment interface into which one or more of the transaction outputs are integrated.

3 Claims, 23 Drawing Sheets

(56) References Cited

OTHER PUBLICATIONS

Beth Lipton Krigel, Start-up Wins e-Commerce Patent, Aug. 10, 1998, News.com.com.*

Platinum Payoff, May 1998, CardTrak Online.*

"Poilic and Pitches (A numer of magazines have developed online interactive sales pitches to advertise)", DialogWeb™, Jan. 29, 1997.

Rodney J. Moore, Games Without Frontier, (http://www.demographics.com/publications/mt/97_mt/9709$_{13}$ mt/mt970921.html), Sep. 1997.

Lynn Bronikowski, "Consumers Double Online Spending", The Denver Post Online,Dec. 8, 1999.

"The Inside Track", Vancouver Sun, Travel Section, p. C1 / Front, Jun. 7, 1997.

Jerri L. Ledford, "An Offer you Can't Refuse, Is demanding pricing the next road to Net Riches, or merely a marketing gimmick?", Office.com , Feb. 11, 2000.

"How to Haggle", Hagglezone.com™—Where Everything's Negotiable, download date Feb. 11, 2000.

Tim J. McClain, "Entreprenuer builds a leading-edge company and web payment system around his vision of the right way to do Internet Marketing", San Diego Metropolitan , downloaded Feb. 17, 2000.

"Make Us An Offer", (http://www.makeusanoffer.com/cgi-bin/home.cgi), download date Mar. 9, 2000.

"Online Department Store Offers Real-Time Haggling", (http://www.8.techmall.com/techdocs/TS981202-3.html), downloaded Mar. 14, 2000.

"IBM Virtual World Available As Free Download on Web (IBM is offering IBM Virtual World on the Web as a free download demo; 3-D program that is an interface)", DialogWeb™, Dec. 11, 1995.

A Technology for the Cyber-Marketing Age (First Virtual Holdings has developed virtual tags, which places the transaction process into multimedia advertisements), DialogWeb™, Sep. 18, 1996.

* cited by examiner

|  | TRANSACTION IDENTIFIER 350 | TRANSACTION INPUT Z 352 | TRANSACTION INPUT S 354 | TRANSACTION INPUT R 356 |
|---|---|---|---|---|
| 358 → | T-56431 | 3 | $9.00 | TUESDAY |
| 360 → | T-41388 | 23 | $4.50 | MONDAY |
| 362 → | T-21269 | 5 | $7.80 | FRIDAY |

| RULE IDENTIFIER 400 | CONDITION 402 | RESULT 404 |
|---|---|---|
| R-3695 | IF X>Y | THEN F(X,Y,Z)=2*X+Y-Z |
| R-1963 | IF X=Y | THEN OFFER IS ACCEPTED |
| R-2491 | IF Y>X | IF F(X,Y,Z)=X, THEN YES; IF F(X,Y,Z)=Y, THEN MAYBE; ELSE NO |
| R-8680 | IF R>5 WHERE R IS A TRANSACTION INPUT GENERATED BY A RANDOM NUMBER GENERATOR | THEN ACCEPT OFFER |

| PRODUCT/ SERVICE IDENTIFIER 500 | SELLER OF THE PRODUCT/ SERVICE 502 | INTERNAL PRICE HURDLE 504 |
|---|---|---|
| PR-76-0952 | STORE T | $300.00 |
| PR-23-7109 | STORE L | $250.00 |
| PR-41-9095 | STORE K | $575.00 |

FIG. 8

| CUSTOMER IDENTIFIER 600 | TRANSACTION IDENTIFIER 602 | TRANSACTION OUTPUT 604 | ENTERTAINMENT INTERFACE 606 |
|---|---|---|---|
| C-34K34K | T-56431 | 9 | ANIMATION OF A BASKETBALL MISSING THE HOOP REPEATED TWO TIMES |
| C-FF34FF | T-41388 | OFFER IS ACCEPTED | ANIMATION OF A SLOT MACHINE REEL THAT SPINS AND STOPS ON "YES" |
| C-F34FKK | T-21269 | 6 | ANIMATION OF A BASKETBALL "SWOOSHING" THROUGH HOOP REPEATED SIX TIMES |

FIG. 11

| TRANSACTION IDENTIFIER 780 | PRODUCT IDENTIFIER 782 | PRICE 784 | WAS TOKEN USED? NO=0 YES=1 786 | GAS STATION THAT CUSTOMER WILL CONSIDER 788 | VEHICLE SIZE 790 | NUMBER OF TANKS OF GAS 792 |
|---|---|---|---|---|---|---|
| T-31292 | 89 OCTANE GRADE GAS | $1.53/GALLON | 0 | MOBIL AT RT. 149 AND LENNOX AVE. SHELL AT MAIN ST. AND 48TH | 12 GALLON TANK | 50 |
| T-31416 | 89 OCTANE GRADE GAS | $1.50/GALLON | 0 | TEXACO AT PARK AVE. AND E. MAIN ST. SHELL AT MAIN ST. AND 48TH AVE. EXXON AT NORTH AVE. AND PARK AVE. | 15 GALLON TANK | 3 |
| T-31738 | 91 OCTANE GRADE GAS | $1.25/GALLON | 1 | MOBIL AT I-95 EXIT 15 EXXON AT NORTH AVE. AND PARK AVE. | 12 GALLON TANK | 1 |

752

794 → (row 1)
796 → (row 2)
798 → (row 3)

FIG. 14

| CUSTOMER IDENTIFIER 826 | NUMBER OF PREVIOUS VISITS 828 | DOLLAR VOLUME TO DATE 830 | FINANCIAL ACCOUNT IDENTIFIER 834 | TOKEN BALANCE 836 | TARGET BRAND IDENTIFIERS 838 |
|---|---|---|---|---|---|
| ANDY | 2 | $434.23 | 1234-2345-3456-4576 | 0 | SHELL |
| SCOTT | 13 | $3453.32 | 5432-5432-5423-5423 | 3 | TEXACO |
| JAMES | 5 | $2343.56 | 1324-1344-1234-6342 | 52 | MOBIL |

FIG. 16

| CONDITION 846 | RESULT 848 |
|---|---|
| 840 → (IF A VISA CROSS SUBSIDY HAS BEEN SELECTED TO BE OFFERED TO THE CUSTOMER) AND (IF 89 OCTANE GRADE GAS) | THEN {IF GAP<0, THEN CUSTOMER OFFER IS ACCEPTED; IF $0.10/GALLON ≥GAP>0, THEN CUSTOMER OFFER WILL ONLY BE ACCEPTED IF CUSTOMER AGREES TO TERMS OF VISA CROSS SUBSIDY; IF GAP>$0.10/GALLON, THEN CUSTOMER OFFER IS NOT ACCEPTED.} |
| 842 → (IF A MOBIL CROSS SUBSIDY HAS BEEN SELECTED TO BE OFFERED TO THE CUSTOMER) AND (IF 89 OCTANE GRADE GAS) | THEN {IF GAP<0, THEN CUSTOMER OFFER IS ACCEPTED; IF $0.11/GALLON≥GAP>0, THEN CUSTOMER OFFER WILL ONLY BE ACCEPTED IF CUSTOMER AGREES TO TERMS OF MOBIL CROSS SUBSIDY; IF GAP>$0.11/GALLON, THEN CUSTOMER OFFER IS NOT ACCEPTED.} |
| 844 → IF TIME CROSS SUBSIDY HAS BEEN SELECTED TO BE OFFERED TO THE CUSTOMER | THEN {IF GAP<0, THEN CUSTOMER OFFER IS ACCEPTED; IF $0.11/GALLON>GAP>0, THEN CUSTOMER OFFER WILL ONLY BE ACCEPTED IF CUSTOMER AGREES TO TERMS OF TIME CROSS SUBSIDY; IF GAP≥$0.11/GALLON, THEN CUSTOMER OFFER IS NOT ACCEPTED.} |

| PRODUCT IDENTIFIER 866 | GAS STATION THAT CUSTOMER WILL CONSIDER? 868 | PRICE 870 |
|---|---|---|
| 89 OCTANE GRADE GAS | MOBIL AT RT. 149 AND LENNOX AVE. | $1.56 |
| 89 OCTANE GRADE GAS | SHELL AT MAIN ST. AND 48TH ST. | $1.56 |
| 91 OCTANE GRADE GAS | MOBIL AT RT. 149 AND LENNOX AVE. | $1.83 |

FIG. 18

| CUSTOMER IDENTIFIER 886 | TRANSACTION IDENTIFIER 888 | TRANSACTION OUTPUTS 890 | ENTERTAINMENT INTERFACE 892 |
|---|---|---|---|
| ANDY | T-31214 | 1. MAYBE 2. YES | 1. SPINNING SLOT MACHINE REEL THAT STOPS ON "MAYBE" 2. SPINNING SLOT MACHINE REEL THAT STOPS ON "YES" |
| SCOTT | T-76553 | YES | SPINNING SLOT MACHINE REEL THAT STOPS ON "YES" |
| JAMES | T-78924 | NO | SPINNING SLOT MACHINE REEL THAT STOPS ON "NO" |

FIG. 19

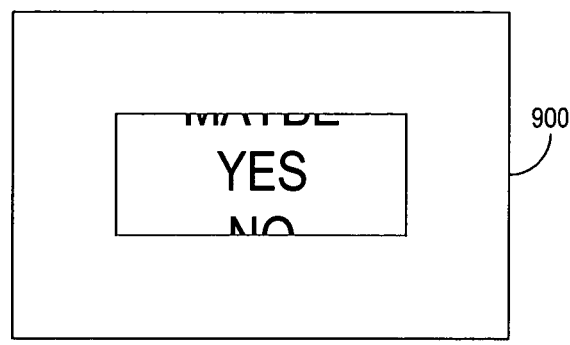
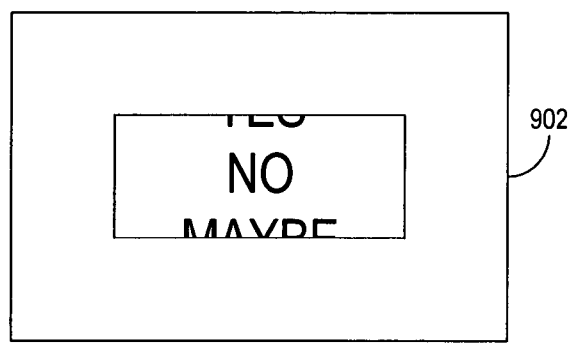
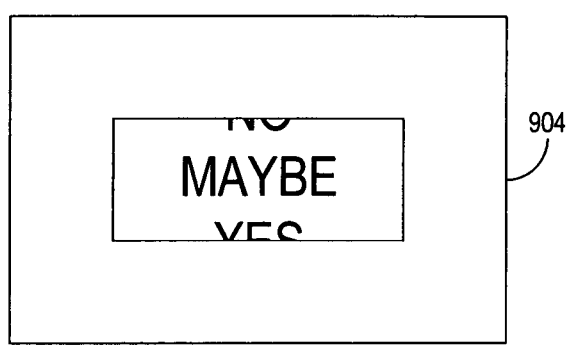
FIG. 20

ENTERTAINMENT LAYER OVERLAID ON ONLINE TRANSACTIONS

BACKGROUND OF THE INVENTION

1. Field of the Invention

This invention relates generally to a method and apparatus for conducting a transaction for products or services and more particularly, to a method and apparatus for presenting, delivering, displaying or otherwise providing a transaction outcome to a customer via an entertainment interface.

2. Description of the Prior Art

Transactions for products or services often may involve receiving one or more transaction inputs or entries from a customer, customer device, etc. and then computing one or more transaction outputs based on the transaction inputs. For example, for each item presented at a point-of-sale terminal at a grocery store, the point-of-sale terminal may determine the number of each item being purchased and multiply it by the item's associated price. The inputs of the transaction may include the quantity of each item, the item's price, applicable item discounts or rebates, etc. The outputs of the transaction may include the pre-tax and post-tax prices for all of the items. Similarly, a web site used to sell items, such as books, on the World Wide Web may total the unit costs for all of the books being purchased, the selections of the books being included in the transaction inputs, and then compute a total price to be charged to the customer. The total price is a transaction output for this example.

Unfortunately, many transactions are complicated and often take more than an insubstantial amount of time to complete or to provide a resolution to a customer. If a customer conducting a transaction is provided with entertainment prior to, or during, the presentation or delivery of one or more transaction outputs, the customer will be more likely to enjoy the transaction experience and may place great value in the entertainment itself, even if the customer's desired transaction is not ultimately successful or completed. Such entertainment may also reduce any negative opinions formed by the customer towards the web site, retailer, manufacturer, etc. conducting the transaction and any hesitation the customer may have to initiate or conduct another transaction. Therefore, despite the state of the art in transaction processing for products and services, there remains a need for a method and apparatus for conducting a transaction for products or services wherein a customer is provided with entertainment or other diversion during or prior to the delivery of one or more transaction outputs or outcomes.

SUMMARY OF THE INVENTION

Accordingly, it is an object of the present invention to provide a method and apparatus for conducting a transaction for a product and/or service, wherein one or more outputs of the transaction are provided to a customer via an entertainment interface.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for conducting a transaction includes providing a transaction interface; receiving at least one transaction input; determining at least one transaction output; and providing at least one of the at least one transaction outputs integrated with an entertainment interface.

Another embodiment of a method for conducting a transaction in accordance with the present invention includes receiving at least one transaction input from a customer in accordance with a transaction interface previously provided to the customer; determining at least one transaction output according to at least one rule; and providing at least one of the at least one transaction outputs via an entertainment interface.

A further embodiment of a method for conducting a transaction in accordance with the present invention includes receiving at least one transaction input from a customer in accordance with a transaction interface previously provided to the customer; determining at least one transaction output according to at least one rule; and providing at least one of the at least one transaction output in such a manner that the at least one transaction output appears to have been determined randomly.

Still another embodiment of a method for conducting a transaction in accordance with the present invention includes receiving at least one transaction input from a customer in accordance with a transaction interface previously provided to the customer; determining at least one transaction output according to at least one first rule; and providing at least one of said at least one transaction outputs in such a manner that said at least one transaction output appears to have been determined according to a second rule different from the first rule.

Yet another embodiment of a method for conducting a transaction in accordance with the present invention includes receiving at least one transaction input from a customer in accordance with a transaction interface previously provided to the customer; determining at least one transaction output according to at least one rule; and providing at least one of the at least one transaction outputs in such a manner that said at least one transaction output appears to have been determined in a manner other than in accordance with the at least one rule.

Also to achieve the foregoing and other objects and in accordance with the purposes of the present invention, as embodied and broadly described herein, an apparatus for conducting a transaction includes a memory; a communication port; and a processor connected to the memory and the communication port, the processor being operative to provide a transaction interface; receive at least one transaction input; determine at least one transaction output; and provide at least one of the at least one transaction outputs integrated with an entertainment interface.

Another embodiment of an apparatus in accordance with the present invention includes at least one simulated slot machine reel integrated with at least one transaction output of the transaction.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings:

FIG. 5 is a tabular representation of a possible data structure for the second transaction input database of FIG. 3;

FIG. 6 is a tabular representation of a possible data structure for the rule database of FIG. 3;

FIG. 8 is a tabular representation of a possible data structure for the product/service database of FIG. 3;

FIG. 11 is a tabular representation of a possible data structure for the transaction database of FIG. 3;

FIG. 14 is a tabular representation of a possible data structure for the transaction input database of FIG. 13;

FIG. 16 is a tabular representation of a possible data structure for the customer database of FIG. 13;

FIG. 17 is a tabular representation of a possible data structure for the rule database of FIG. 13;

FIG. 18 is a tabular representation of a possible data structure for the product/service database of FIG. 13;

FIG. 19 is a tabular representation of a possible data structure for the transaction database of FIG. 13;

FIG. 20 is an illustration of a possible entertainment interface used with the entertainment interface database of FIG. 13;

DETAILED DESCRIPTION OF THE EMBODIMENTS

Figure 1:
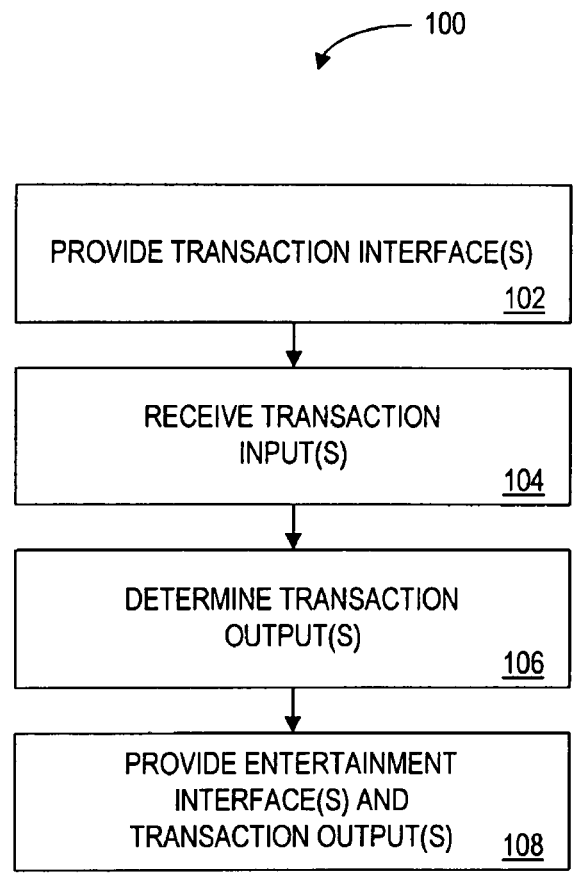
FIG. 1 is a flowchart of a first embodiment of a method in accordance with the present invention.

A need exists for a method and apparatus for providing one or more transaction outputs, also called transaction outcomes, to a customer, customer device, etc. via an entertainment interface into which one or more of the transaction outputs preferably are integrated. A first embodiment 100 of a method in accordance with the principles of the present invention is illustrated in FIG. 1. The method 100 allows a customer (also referred to as a "user" or "shopper") to initiate, complete, or otherwise conduct a transaction for purchasing, renting, leasing, etc. one or more products or services during which the customer will provide one or more transaction inputs in response to a transaction interface being provided or displayed to the customer. In addition, or alternatively, one or more transaction inputs may be obtained from one or more sources other than the customer. Upon receipt of appropriate transaction inputs, one or more transaction outcomes or outputs preferably will be determined, based at least in part on or using one or more transaction inputs. A transaction output may represent a numerical number, an indication of a selection, an affirmation or rejection of the transaction inputs or the customer's transaction offer created by the customer provided transaction inputs, etc. Preferably, either prior to providing a transaction output to the customer, or during the presentation of the transaction output to the customer, the customer is provided with entertainment or other diversion via an entertainment interface thereby making the transaction, and/or any delay in receiving a transaction output, a more positive experience for the customer. More specifically, in accordance with the present invention, one or more transaction outputs preferably are provided, displayed, etc. to the customer in an integrated manner with an entertainment interface such that the entertainment interface and the transaction output(s) create a singular or unified impression or appearance to the customer. The entertainment provided to the customer via the entertainment interface may have great value to the customer in that the customer enjoys the entertainment, the entertainment simplifies a presentation or understanding of a transaction output to the customer, the entertainment is fun for the customer to watch or participate in, the entertainment helps the customer "kill" or bide time prior to a transaction output being determined and/or presented to the customer, the entertainment reduces any hesitation the customer may have as to initiating or conducting another transaction, etc. As a result, the entertainment may reduce, or even eliminate, any ill will or negative opinions formed by the customer towards the transaction enabler or provider, such as a web site, web site operator or owner, retailer, manufacturer, etc., particularly if the customer is unhappy with an outcome of the transaction or an unfavorable transaction outcome is determined. In addition, the entertainment may create a situation in which a customer believes that he or she may be able to influence the outcome of a transaction or that one or more of the transaction outcomes or outputs were based on different transaction inputs or in accordance with different rules than the inputs or rules actually used to determine the transaction outcome. The term "customer" as used herein should be construed broadly and no specific limitation or definition is implied by use of the term "customer." In addition, the term "customer" should include any user, shopper, transaction participant, etc.

The method 100 illustrated in FIG. 1 includes a step 102 during which a transaction display, screen, menu, framework, layer or other interface is presented to a customer or other user or initiated by the customer or other user for a transaction for at least one product and/or service. The transaction interface preferably provides information, test material, graphics, banners, software, video, audio, displays, guidelines, etc. needed by the customer so that the customer can conduct or otherwise participate in the transaction and provide one or more transaction inputs which will be received during a step 104. In addition, or in contrast, transaction inputs from sources other than the customer may also be received during the step 104 and used to conduct or complete the transaction. The transaction interface preferably is associated with a transaction being completed, initiated or otherwise conducted by the customer for the purchase, rental, lease, etc. of one or more products and/or services. The transaction interface also preferably requests, explicitly or inherently, that a customer to whom the transaction interface is presented or displayed provide transaction information or inputs to a central source, controller, computer, etc. For example, a customer placing an online order via a web site for an airline flight reservation may be presented during the step 102 with an online order form requesting that the customer fill in desired departure date, desired departure time, desired departure airport, desired arrival airport, and perhaps a maximum price that the customer is willing to pay. The order form displayed to the customer forms some or all of the transaction interface presented during the step 102. During the step 104, information provided by the customer regarding the customer's desired departure date, time and airport, the desired arrival airport, and the maximum price are some or all of the transaction inputs received during the step 104 by the central source, controller, computer, etc. During a step 106, a transaction outcome preferably is determined, selected, calculated, identified, etc. (all of which will herein be used interchangeably with "determined") based, at least in part, on one or more of the transaction inputs received from a customer, customer device, or other source during the step 104. Then, during a step 108, the transaction outcome is presented or otherwise provided, transmitted, displayed, etc. to the customer, customer device, etc. preferably in conjunction with or after the presentation or delivery of an entertainment framework, display, or other interface to the customer, customer device, etc.

The entertainment interface may comprise a graphic or video display, animation, banner, text message, advertisement, display, audio clip, etc. and may be unnecessary, and possibly even unrelated, to the transaction. In addition, the entertainment interface and the transaction outcome preferably are presented in an integrated fashion so that the transaction outcome forms part of, and is expressed in or during, the entertainment interface. That is, the transaction outcome is needed to complete the entertainment provided by the entertainment interface and the transaction outcome and the entertainment interface create a unified impression on the customer. The transaction outcome may also represent something of great value to the customer, such as the size of a rebate, discount, etc. in addition to the value provided by the entertainment interface itself. The method 100, and each of the steps 102, 104, 106, 108 will be discussed in further detail below.

Figure 2:
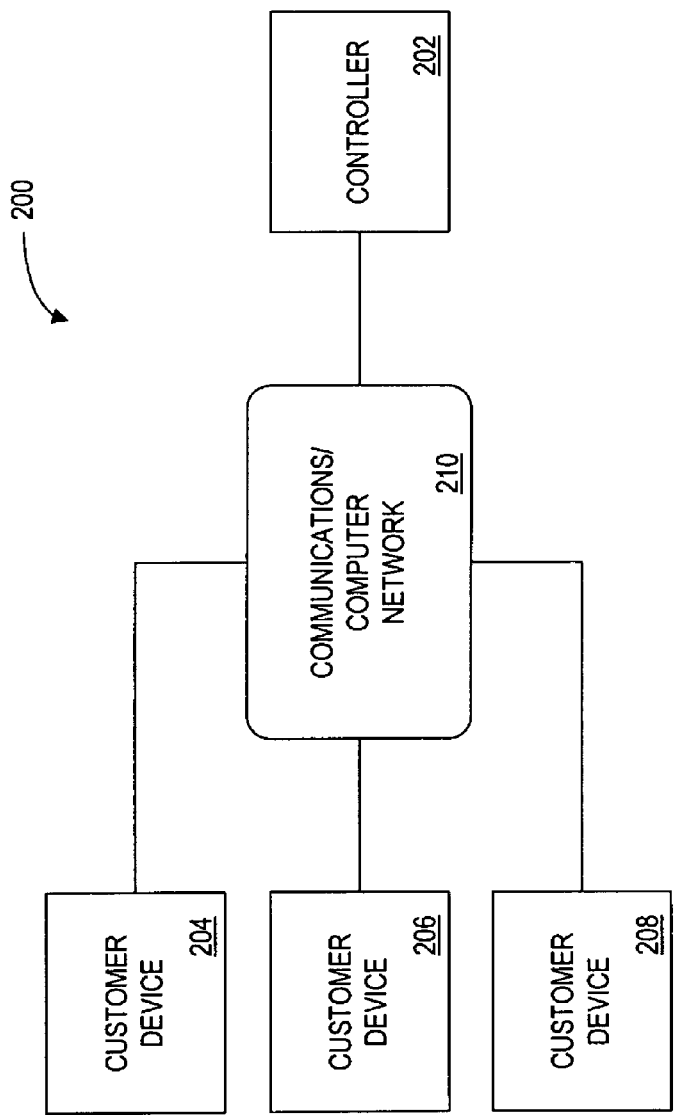
FIG. 2 is a block diagram of system components for an embodiment of an apparatus usable with the method of FIG. 1.

Now referring to FIG. 2, an apparatus or system 200 usable with the method 100 is illustrated. The apparatus 200 includes a controller 202 that may communicate with one or more customer or user devices 204, 206, 208 via a computer, data, or communications network 210. The controller 202 preferably performs the steps 102, 104, 106 and 108 of the method 100 and receives information, inputs, etc. from customers who may be using the customer devices 204, 206, 208. The customer devices 204, 206, 208 preferably allow customers to interact with the controller 202 and the remainder of the apparatus 200. The customer devices 204, 206, 208 may also enable a customer to receive communications from the controller 202. If desired, the customer devices 204, 206, 208 may also be connected to or otherwise in communication with other devices.

The computer network 210 might be the Internet, the World Wide Web, or some other public or private computer or communications network or intranet, as will be described in further detail below. The communications network 210 is only meant to be generally representative of cable, computer or other communication networks for purposes of elaboration and explanation of the present invention. Thus, other devices, networks, etc. may be connected to the communications network 210 without departing from the scope of the present invention. The communications network 210 is also intended to be representative of, and include all or a part of, the Internet, the World Wide Web, and other privately or publicly operated networks. The communications network 210 can also include other public and/or private wide area networks, local area networks, data communication networks or connections, intranets, routers, satellite links, microwave links, cellular or radio links, fiber optic transmission lines, ISDN lines, T1 lines, DSL, etc.

Now referring again to FIG. 1, the method 100 and the steps 102, 104, 106 and 108 will be discussed in more detail in relation to the system 200 illustrated in FIG. 2. As previously discussed above, the method 100 includes a step 102 during which one or more transaction interfaces are displayed, presented or otherwise provided to a customer. The transaction interface(s) preferably is/are associated with a transaction being conducted or initiated by, for or under the control of the customer for the purchase, rental, lease, sale, etc. of one or more products or services. A transaction interface may be created, displayed or otherwise provided by the controller 202, a customer device, and/or some other device. Different types of transactions may have different transaction interfaces associated with them. For example, a transaction wherein a customer purchases gasoline may have a different transaction interface than a transaction wherein a customer purchases dresses. Presumably, the transaction interface for the gasoline would not request that the customer provide information regarding the customer's dress size, and the transaction interface for the dresses would not request that the customer provide information regarding the customer's preference for "premium" or "regular" gasoline.

A transaction may have more than one transaction interface associated with it that are provided or displayed to a customer during the transaction. A transaction interface may have more than one associated display, screen, graphic image, form, banner, check box, menu, fill-in-the-blank area, etc. associated with it that are provided or displayed to a customer, either simultaneously or sequentially during a transaction. The number and order of presentation or delivery of screen displays, banners, menus, graphic images, forms, etc. for a transaction interface may be variable and change during or between transactions. Each transaction interface may request or require that a customer provide one or more transaction inputs.

As the transaction interface or display may comprise or include an order form, check box, fill-in-the-blank form, menu, audio signal, text message, banner, animation, video signal, graphic display, etc., the method 100 is not limited to any specific type of transaction interface or display or components thereof. For example, a transaction interface displayed or presented during the step 102 for a transaction wherein a customer is buying products and/or services may comprise or include a list or menu of grocery products, flowers, clothing items, theater tickets, long distance telephone service providers, cars, rental cars, books, software products, gasoline products, airline flights, hotel accommodations, etc. that a customer can select or select from. As a further example, a transaction interface displayed or presented during the step 102 may comprise or include a display with blocks or areas to be filled in with financial and personal information related to insurance or a mortgage that a customer is attempting to acquire during the transaction. The financial and personal information provided by the customer will form one or more transaction inputs that will be received during the step 104.

During the step 104, the controller 202, a customer device, or some other device may receive one or more transaction inputs from a customer, customer device, etc. Preferably, the transaction inputs will be in response to the transaction interface provided to the customer during the step 102, or at least will relate to the same transaction as does the transaction interface provided to the customer during the step 102. However, transaction inputs received during the step 104 may also include information, data, etc. obtained from sources other than the customer or from the customer during previous transactions. Thus, for example, if the transaction interface is associated with a transaction during which a customer is buying grocery items online via a web site, the transaction interface may include one or more screens displayed to a customer with which the customer can select items to be purchased, the quantity to be purchased for each item, etc. The product selection and product quantity information provided by the customer are among the transaction inputs for the transaction. In addition, transaction inputs also may include information or data from a credit agency or other source other than the customer regarding the customer's credit history or credit limit, the quantity of the each of the desired items in inventory, the existence of a discount or rebate provided by one or more manufacturers, the current temperature, etc.

As another example, a transaction interface may be provided to a potential renter during the step 102 that relates to apartment rentals for a specific building. The potential renter is engaged in a transaction for apartment rental services. The potential renter may provide transaction inputs in response to the presented transaction interface regarding the renter's credit risk, employment, monthly income, number of pets, number of children, rental history, etc. The transaction inputs preferably are received from the potential renter by the controller 202, a customer device, or another device during the step 104. The controller 202 may also obtain other transaction inputs, such as the potential renter's credit rating, rental history, criminal record, etc. from sources other than the potential renter. Transaction outputs may include whether or not the renter's application for an apartment rental in the building is approved or denied, the amount of security deposit the renter may have to pay, the specific apartment the renter may be offered, etc.

As a third example, a transaction interface may be provided during the step 102 to a high school student interested in attending a particular college. Thus, the student is engaged in a transaction for education services. The student may provide transaction inputs such as SAT score, high school grade point average, extra-curricular activities, family finances, educational goals, desired major, etc. The transaction inputs preferably are received from the student by the controller 202, a customer device, or another device during the step 104. The controller 202 may also access information such as university admission standards, availability of scholarships, number of admissions already made, etc. to obtain one or more transaction inputs that may be used to determine a transaction outcome for the student, such as whether the student will be accepted at the college, whether a scholarship can be provided to the student, etc.

If desired, the controller 202, a customer device, or another device may access or update a transaction database or transaction input database during the step 102 or the step 104 to log or store inputs, time, date and other information regarding a transaction being conducted by a customer, the transaction interface presented to the customer during the step 102, the transaction inputs received from a customer during the step 104, the transaction inputs received from other sources during the step 104, etc.

The transaction interface provided during the step 102 may be provided a short or long time before the transaction inputs are received during the step 104. The transaction inputs received during the step 104 may be received a fixed, random, or variable time after the transaction interface is provided during the step 102. Furthermore, the transaction interface provided during the step 102 may be provided with a different channel or medium of communication (e.g., email, U.S. mail, telephone, facsimile, radio transmission, Federal Express service, online downloading or serving of information, etc.) than the entertainment interface provided during the step 108. In addition, the transaction interface provided during the step 102 may be provided with a different channel or medium of communication than the channel or medium of communication via which transaction inputs are received during the step 104. For example, a transaction interface for a transaction may be provided via U.S. mail to a customer, who then some time later (e.g., an hour, day, week, etc.) sends or provides one or more transaction inputs via telephone for the transaction. During the step 108, a transaction interface integrated with one or more transaction outputs may be provided to the customer in an animation sent to the customer via email. The step 106 may occur or be completed, initiated, etc. a short or long time after the completion of the step 104 or a fixed, random, or variable time later and the step 108 may occur or be completed, initiated, etc. directly after the completion of the step 106 or a fixed, random, or variable time later.

During the step 106, one or more transaction outcomes or outputs preferably are computed by the controller 202, a customer device, or some other device for the transaction being conducted by the customer. Thus, the transaction outcomes determined during the step 106 preferably relate to, or are associated with, the transaction interface presented during the step 102. A transaction outcome may take many different forms and have many different meanings depending on the context of the transaction being conducted, or participated in, by the customer. For example, a transaction outcome of "40" may represent that the customer is able to purchase a product for forty dollars, that the customer is purchasing forty of a product, that the customer now has a forty percent chance of winning a prize in a store's lottery, that the customer is getting a forty percent discount off the customer's next purchase, etc. A transaction outcome may also be a text message. For example, transaction outcome of "YES" may indicate to a customer that an offer provided by the customer during the transaction has been accepted, that the customer will be able to buy a specific product at a specific price, that the customer will be receiving a discount or rebate on the customer's next purchase, that the customer's offer to buy a specified plane ticket at a specified price has been accepted, that the customer will be allowed to rent an apartment, that the customer will be admitted to a certain college, etc. A transaction outcome of "NO" may indicate just the opposite. A transaction outcome of "MAYBE" may indicate that the customer's offer to buy a specific grocery item will be accepted if the customer increases a price offered for the grocery item or if the customer agrees to perform another function or condition, that the customer is on a waiting list for acceptance into an apartment complex, college, etc., that the customer needs to provide additional information, etc. A transaction outcome of "MAYBE" might also indicate that the transaction outcome is pending or still being determined, that a transaction outcome close to a customer's desired transaction outcome is possible, etc.

While one or more of the transaction outcomes may also be associated with the transaction inputs received from a customer, customer device, etc. during the step 104, a transaction outcome may also be based solely on a transaction input received from a source other than the customer during the step 104. For example, a customer may be conducting a transaction during which the customer offers a price bid for a specific car being auctioned off on a web site. The customer's price bid may be considered as a transaction input. In some situations, the web site operator conducting the auction may accept or reject the customer's offer solely base on the customer's price bid. In other situations, the web site operator may request from a third party to receive a status of the customer's credit limit or rating, which may also be considered as a transaction input for the car auction transaction, even though the customer did not provide the transaction input. If the customer's credit limit or rating is too low, the web site operator may reject the customer's stated price bid, the rejection constituting a transaction output, without even considering or taking into account the customer's price bid. Thus, the transaction output is determined solely based on a transaction input that was not received from the customer and the customer provided transaction input was not used to determine the transaction output.

The transaction outcomes or outputs determined during the step 106 may be determined according to one or more rules, which may include one or more formulas, calculations, algorithms, methods, processes, heuristics, procedures, etc. A rule database may be kept or accessed by the controller 202, a customer device, or other device performing the step 106. The rule database may store information regarding rules that may be applied to transaction inputs. Different transaction interfaces, transactions, transaction inputs, etc. may use one or more different rules to generate their associated one or more transaction outputs.

During the step 106, the controller 202, a customer device or another device may identify or select a rule to apply to one or more of the transaction inputs received during the step 102 and apply the rule to the transaction inputs to determine one or more transaction outputs. A transaction input might affect both the rule identified and how the identified rule is used, along with the transaction input, to create at least one transaction output. For example, in a transaction being conducted by a customer wherein the controller 202 determines a discount to be received by a customer purchasing grocery items, transaction inputs A and B, both representing numerical numbers, may be received from the customer during the step 104. The transaction input A may represent the number of cases of soda that the customer is willing to purchase during a transaction and the transaction input B may represent the number of bags of potato chips that the customer is willing to purchase during the transaction. If desired, the size of the discount can also be considered as a transaction input received during the step 104, even though the discount information did not come from the customer.

In this example, when identifying a rule to apply to the transaction inputs to determine a transaction output, for example, the total price of the transaction, one of the following three rules may be applied:

If $A>B$ then apply Rule 1, wherein total price pretax equals ($1.69 \times 0.90 \times A)+($0.75 \times B)$, if $A<B$ then apply Rule 2, wherein total price pretax equals ($1.69 \times A)+($0.75 \times 0.90 \times B)$, or if $A=B$ then apply Rule 3, wherein total price pretax equals ($1.69 \times 0.95 \times A)+($0.75 \times 0.95 \times B)$, wherein each case of soda has a price of $1.69 and each bag of potato chips has a price of $0.75. In this example transaction, a customer gets a ten percent discount for the one of the two products that the customer is buying the most of, except when Rule 3 applies in which case the customer is buying the same number of both products and a five percent discount is applied to both products, and a rule is selected to compute a final price based on the transaction inputs. The transaction output includes the total price of the cases of soda and bags of potato chips the customer is buying.

As another example of a transaction for grocery items, a customer may receive a discount for one or more grocery items or products if the customer is willing to try to purchase a third grocery product, the amount of the discount depending on the number of items of the third product that the customer purchases. In addition, assume that transaction inputs C, D and E are received from a customer during the step 102. The transaction input C may represent the number of boxes of a new cereal that the customer is willing to purchase during the transaction, and the transaction inputs D and E may represent the number of some other products, for example, laundry detergent and frozen dinners, that the customer is willing to purchase during the transaction. In this example, the higher the number of boxes of cereal the customer purchases, i.e., the higher the value for C, the greater the discount the customer will receive for the laundry detergent and the frozen dinners. The size of the discounts can also be considered as transaction inputs, even though the discount information did not come from the customer.

When identifying a rule to apply to the transaction inputs to determine a transaction output, for example, the total price of the transaction, one of the three following rules may be applied in the example transaction:

If $C=0$ then apply Rule 1, wherein total price pretax equals ($1.50 \times C)+($2.75 \times D)+($0.75 \times E)$, if $C=1$ then apply Rule 2, wherein total price pretax equals ($1.50 \times C)+(($2.75 \times D)+($0.75 \times E)) \times 0.90$, or if $C>1$ then apply Rule 3, wherein total price pretax equals ($1.50 \times C)+(($2.75 \times D)+($0.70 \times E)) \times 0.85$, wherein each box of cereal has a price of $1.50, each box of laundry detergent has a price of $2.75, and each frozen dinner has a price of $0.75. In this example transaction, the customer gets different prices for the laundry detergent and the frozen dinners depending on the number of boxes of new cereal that the customer purchases. However, the price for each box of cereal remains constant.

As previously discussed above, the identification or selection of which rule to apply may also depend on or use information or transaction inputs not provided by a customer. For example, during a transaction for a product, different rules may apply for different levels of available inventory, the status of a customer as new customer, frequent customer, etc., whether the product is soon to expire or otherwise become unsellable or unusable, whether the transaction is occurring during a special event or promotion, such as a sale, a birthday, etc., the day of the week or year, the time of day, the location of the customer conducting the transaction, etc. In some embodiments, multiple rules may be selected or used to create or determine one or more transaction outputs during the step 106.

During the step 108, the controller 202, a customer device, or some other device preferably provides, sends, or otherwise makes available one or more transaction outcomes or outputs to the customer, or to some other person or device designated by the customer, the controller 202, etc., via an entertainment interface such that the transaction outcomes are integrated into the entertainment interface. The term "entertainment interface" should be interpreted broadly and is not limited to games of amusement, information presentation, flashy visual or audible presentations, etc.

Preferably, the entertainment interface provided during the step 108 is unnecessary for the transaction and/or how the transaction outcome is determined. In addition, the entertainment interface preferably is unrelated to the transaction and is integrated with the presentation or delivery of one or more transaction outputs. An "unnecessary" entertainment interface includes interfaces that are not needed to conduct the transaction or to provide a transaction output to a customer. For example, the car driving and race simulation entertainment interface described above is not needed to conduct a transaction for selling insurance, grocery items, gasoline, airline tickets, or other products or services to a customer. Rather, the entertainment interface provides an ancillary and separate impression for the customer with regard to a transaction interface, thereby enhancing the value of the entertainment interface itself. Furthermore, the car driving and race simulation entertainment interface is completely unrelated to the subject matter or context of the transactions. While graphics, animations, etc. may be used during a transaction or as part of a transaction interface, the entertainment interface preferably is separate and distinct from those graphics, animations, etc. such that a clear end to the transaction interface and a clear start to the entertainment interface is created. Moreover, the entertainment interface and the transaction interface preferably create separate and distinct impressions to or for a customer. In some embodiments, the entertainment interface may relate to a transaction being conducted by a customer. For example, a customer participating in a transaction during which the customer is buying golf clubs receives a golf related entertainment interface.

An integrated entertainment interface and one or more transaction outputs preferably is more than just simultaneous appearance on a display of the entertainment interface and the one or more transaction outputs. That is, an integrated entertainment interface and one or more transaction outputs preferably creates a singular or unitary impression and appearance to a customer such that the entertainment or diversion presented by the entertainment interface is not complete without the presentation or use of, or relationship to, one or more transaction outputs. Thus, while the transaction outputs may be presented in isolation, the entertainment interface preferably cannot be presented separately from the transaction outputs. A transaction output may affect the behavior, operation, and/or look of an entertainment interface. By being unnecessary or unrelated to a transaction, or to the method or rule for determining a transaction output, an entertainment interface presents a clearer impression and appearance to a customer that the entertainment is something extra of value being provided to the customer during the transaction. As a result, the entertainment provided via the entertainment interface becomes a valuable commodity to the customer in its own right, even if the transaction is not completed for any reason. Furthermore, the entertainment may also help distance or reduce any negativity towards a merchant or other operator of the method 100 if the customer's transaction is not completed, if the customer's transaction offer is not accepted, if the transaction takes a significant amount of time to complete, etc.

The entertainment interface presented or provided during the step 108 can be created or modified dynamically or retrieved from a database as needed. In some embodiments, a software script may be used to generate, display and modify the entertainment interface. In addition, the presentation or display of an entertainment interface may require a fixed or variable time to complete. Preferably, the entertainment interface provides an animation or some other changing format, picture, video, etc. so that it is not a static and unchanging presentation of a graphic, image or text message.

The entertainment interface presented or provided during the step 108 may appear to be a game of luck or skill, but the outcome of the game preferably will be interpreted as or with a transaction output. For example, an entertainment interface presented during the step 108 to a customer conducting a transaction may include a car driving game that a customer may play via a customer device. The car driving game is a game of skill in that the customer must control a virtual car and drive it along a race track towards a finish line. The customer competes against a computer controlled car for first place. Such an entertainment interface may be used when a customer submits a price, such as in an auction, for a product or service and the controller 202 determines whether or not to accept the customer's submitted price. If the transaction is not completed or if the customer's price is rejected as a result of the transaction inputs received during the step 104, e.g., the customer submitted too low a price for a product and the transaction output is a rejection by the controller 202 of the customer's submitted price, the outcome of the game may be that the customer loses the car race. For example, regardless of how skilled the customer is at the game, the play level of the computer may be increased as necessary in order for the computer to beat the customer at the game. Alternatively, if the transaction is completed or approved as a result of the transaction inputs received during the step 104, e.g., the customer submitted an acceptable price for the product and the transaction output is an acceptance by the controller 202 of the customer's submitted price, the outcome of the game may be that the customer wins the car race. Thus, regardless of how skilled the customer is at the game, the play level of the computer may be decreased as necessary in order for the customer to beat the computer at the game.

Other examples of an entertainment interface include an entertainment interface for displaying a transaction output for an auction or other transaction wherein the entertainment interface displays a transaction output of "YES" or an acceptance or approval of transaction inputs or a customer's transaction offer. Such entertainment interfaces include an illustration of a golf ball going into a hole, an illustration of a basketball going into a basketball hoop, an illustration of a football field goal attempt being successfully completed, etc. Note that the words or phrases "YES," "OFFER ACCEPTED," etc. may, in some embodiments, not be used in the entertainment interface as a successful completion of the transaction, acceptance of the customer's transaction offer or inputs, as indicated as a transaction output exemplified by the illustration of the golf ball going into a hole, the illustration of the basketball going into the basketball hoop, and the illustration of the football field goal attempt being successfully completed. Therefore, the positive or affirmative transaction output is integrated into the entertainment interface such that the entertainment provided via the entertainment interface is not completed without the presentation or display of the representation of the transaction output.

Other examples of an entertainment interface for an auction or other transaction wherein the entertainment interface displays a transaction output of "NO" or a rejection or non acceptance of transaction inputs or transaction offer include an illustration of a golf ball not going into a hole, an illustration of a basketball not going into a basketball hoop, an illustration of a football field goal attempt not being successfully completed, etc. Note that the words or phrases "NO," "OFFER REJECTED," etc. may, in some embodiments, not be used in the entertainment interface as an unsuccessful completion of the transaction, acceptance of the customer's transaction offer or inputs, etc. is indicated as a transaction output exemplified by the illustration of the golf ball not going into a hole, the illustration of the basketball not going into the basketball hoop, and the illustration of the football field goal attempt not being successfully completed. Therefore, the negative transaction output is integrated into the entertainment interface such that the entertainment provided via the entertainment interface is not completed without the presentation or display of the representation of the transaction output.

Examples of an entertainment interface for an auction or other transaction wherein the entertainment interface displays a transaction output of "MAYBE" or a possible acceptance of transaction inputs or a customer's transaction offer include an illustration of a golf ball moving towards a hole but not yet going into the hole, an illustration of a basketball going toward the basketball hoop but not yet going into the basketball hoop, an illustration of a football field goal attempt being partially completed with the final outcome still in doubt, etc. As in the previous examples, the transaction output is integrated into the entertainment interface.

As illustrated in the previous examples, a transaction output may be presented to a customer during the step 108 in such a way that the customer does not realize or know that the transaction output has already been determined prior to the presentation of the entertainment interface or how the transaction output was determined. Furthermore, in some embodiments, a transaction output may appear to a customer to have been determined randomly, according or relative to the customer's skill at a game presented as part of an entertainment during the step 108, or in accordance with a rule other than the rule or procedure actually used during the step 106 to determine the transaction outcome. As another example, a customer bidding for groceries or otherwise attempting to buy groceries via a web site may be presented with a slot machine reel simulation as an entertainment interface, the outcome of which lets the customer know if the customer's order or offer for grocery items (i.e., the transaction inputs) has been accepted or rejected, the acceptance or rejection being a transaction output. The customer may be asked to "start the slot machine reels spinning when ready" and/or to "stop the slot machine reels from spinning when desired" as a way of incorporating action or activity by the customer into the entertainment interface, thereby giving the customer a feeling of participation in the determination of the transaction output or allowing the customer to control initiation, progression and/or completion or the entertainment interface or any stage of the entertainment interface. In fact, the acceptance or rejection (i.e., the transaction output) of the customer's offer or order (i.e., the transaction input) preferably has previously been determined during the step 106 according to one or more specific rules, which is likely non-random and unrelated to slot machine operation, and the transaction outcome presented via the slot machine simulation preferably follows or accords with the transaction outcome determined during the step 106. Thus, the outcome of the entertainment interface, i.e., the result of the slot machine reel simulation, reflects and incorporates the transaction output determined during the step 106 and the transaction output is integrated into the entertainment interface such that the entertainment provided by the entertainment interface is not completed until the transaction output represented in the entertainment interface is displayed or provided to the customer during the step 108.

As illustrated in the previous examples, the entertainment interface provided during the step 108 may allow a customer to be passive and merely watch the entertainment interface, such as in the slot machine simulation example previously discussed above where a customer does nothing specific to initiate starting or stopping of the spinning of the simulated slot machine's reels. Alternatively, the entertainment interface provided during the step 108 may allow a customer to actively participate at one or more points, such as in the slot machine simulation where a customer hits a button, clicks on a graphic or icon, etc. to initiate spinning of the slot machine's reels and/or to stop spinning of the slot machine's reels. As a further alternative, the entertainment interface provided during the step 108 may allow a customer to actively and continuously participate throughout some or all of the entertainment provided via the entertainment interface, such as in the car driving example entertainment interface previous discussed above. In some embodiments, a customer may be offered the opportunity to select the type of entertainment interface to be used during the step 108 and the level of the customer's involvement or number of customer actions required in the entertainment interface.

In some embodiments, a transaction input can affect the entertainment interface. For example, if a customer offers a large amount of money for a product during a transaction where customers bid on products, such as in an auction, and the controller 202 accepts the offer, a transaction output indicating an acceptance of the customer's offer may be embodied as an easy basketball lay-up shot, as opposed to a more difficult three-point shot, that falls right into basketball hoop. In contrast, if the customer offers a smaller amount of money for the product during the transaction, and the controller 202 accepts the offer, a transaction output indicating an acceptance of the customer's offer may be embodied as a difficult three-point shot, that rolls around the basket rim before falling into the basketball hoop. In addition, in order to convince or motivate the customer to submit an even higher price in the future, or to otherwise indicate that the customer is "pushing his luck," the basketball may just barely fall into the basketball hoop. The customer may be given a chance to change a low offer or a transaction input by, for example, showing a basketball player shooting from half-court if the customer makes the change or indicates a willingness to make the change. The transaction output, i.e., the acceptance of the customer's offer, preferably is integrated into the entertainment interface as represented by the basketball falling or going into the basketball hoop. Furthermore, the entertainment provided by the entertainment interface would not be complete without an indication as to whether the basketball would or would not fall or go into the basketball hoop.

In some embodiments, a transaction input received during the step 104, but relating to an offer or input from someone else, could affect the entertainment interface presented to a customer. For example, one way to encourage a more conservative offer from a customer the next time that the customer submits a transaction input or offer for a product during a transaction is to include in the entertainment interface representations of other customers who have previously provided or who are currently providing transaction inputs or offers. For example, the entertainment interface may create a basketball type simulation wherein a customer sees himself or herself waiting in line to shoot a three point shot, and each customer in front of the customer, i.e., the other customers, is missing the three point shot as a result of one or more of their transaction inputs.

In some embodiments, something other than a transaction input may affect the selection or operation of an entertainment interface presented or provided during the step 108. For example, in the slot machine simulation previously discussed above, a customer may have to mouse click on a simulated slot machine reel in order for the simulated slot machine reel to stop spinning and deliver a transaction outcome embodied as a slot machine outcome. Alternatively, the customer may have to mouse click for a ping-pong ball to be ejected out of a jar, the color of the ping-pong ball indicating the transaction output. In such scenarios, the customer may feel like he or she has controlled influenced the offer output, even though he or she has not. As another example, if a customer initiating a transaction has previously conducted five similar transactions, the entertainment interface provided to the customer during the step 108 may be altered or changed to maintain or further develop the customer's interest in or commitment to conducting additional transactions. For example, a customer who has been presented with the car driving example entertainment interface previously discussed above during a transaction may be presented with a different type of car, different racing course, etc. each time to help maintain the customers interest and perceived value in the entertainment interface. As another example, a customer provided with a basketball foul shooting motif as part of an entertainment interface may also be provided with a running or aggregate score or other information indicative of his or her past performance shooting basketball foul shots or comparing his current performance to past performance.

Other possible and exemplary implementations of an entertainment interface presented, sent or displayed during the step 108 will be discussed in further detail below.

Figure 3:
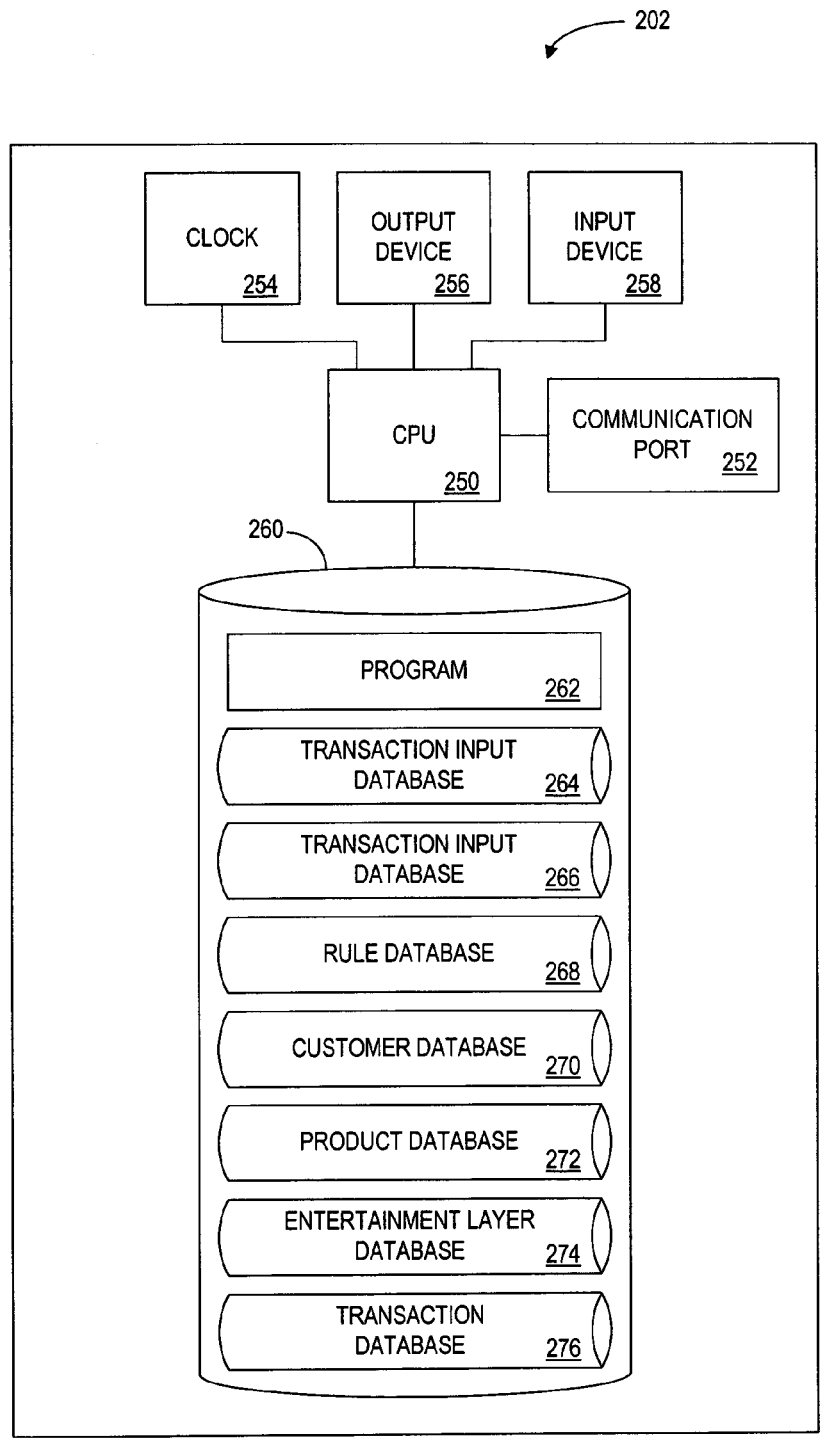
FIG. 3 is a block diagram illustrating a representative controller of FIG. 2.

Now referring to FIG. 3, a representative block diagram of a controller, such as the controller 202, is illustrated. The controller 202 may include a processor, microchip, or computer 250 that is in communication with or otherwise uses or includes one or more communication ports 252 for communicating with customer devices and/or other devices. For example, if the controller 202 is connected to the customer device 204 via an Ethernet local area network, the customer device 206 via a cellular telephone network, and the customer device 208 via a Token Ring type local area network, the controller 202 may have an Ethernet adapter as one communication port to allow the controller 202 to communicate with the customer device 202, a connection to a cellular telephone network as another communication port to allow the controller 202 to communicate with the customer device 206 and a Token Ring adapter to allow the controller 202 to communicate with the customer device 208.

The controller 202 may also include an internal clock element 254 to maintain an accurate time and date for the controller 202 and to create time stamps for transaction inputs received by the controller 202 and transaction interfaces, entertainment interfaces, transaction outputs, etc. generated or sent via the controller 202.

If desired, the controller 202 may include one or more output devices 256 such as a printer, infrared or other transmitter, antenna, audio speaker, display screen or monitor, text to speech converter, etc., as well as one or more input devices 258 such as a bar code reader or other optical scanner, infrared or other receiver, antenna, magnetic stripe reader, image scanner, roller ball, touch pad, joystick, touch screen, microphone, computer keyboard, computer mouse, etc. In addition, the controller 202 may include a voice recognition system or interactive voice response unit as an input device 258 to aid in or enable receiving and processing of transaction inputs. The controller 202 may also include a fingerprint scanner or reader, a retinal scanner, a voice analyzer, or other biometrics data input device as an input device to allow the controller 202 to identify customers, verify transaction inputs, etc. Including an input device in the controller 202 also allows the controller 202 to receive transaction inputs directly while including an output device in the controller 202 allows the controller 202 to provide, display, etc. transaction outputs, transaction interfaces, and entertainment interfaces directly to a customer. If desired, the controller 202 may also function as a customer device.

In addition to the above, the controller 202 may include a memory or data storage device 260 to store information, software, databases, device drivers, transaction interfaces, entertainment interfaces, transaction inputs, transaction outputs, product and service information, user or customer information, etc. The memory or data storage device 260 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk. The processor 250 and the data storage device 260 in the controller 202 may each be, for example: (i) located entirely within a single computer or other computing device; or (ii) connected to each other by a remote communication medium, such as a serial port cable, telephone line or radio frequency transceiver. In one embodiment, the controller 202 may comprise one or more computers that are connected to a remote server computer for maintaining databases.

A conventional personal computer or workstation with sufficient memory and processing capability may be used as the controller 202. In one embodiment, the controller 202 operates as or includes a web server for an Internet environment. The controller 202 preferably transmits and receives data related to transactions and is capable of high volume transaction processing, performing a significant number of mathematical calculations in processing communications and database searches. A Pentium microprocessor such as the Pentium III, manufactured by Intel Corporation may be used for the processor 250. Equivalent processors are available from Motorola, Inc., AMD, or Sun Microsystems, Inc. The processor 250 may also comprise one or more microprocessors, computers, computer systems, etc.

While specific implementations and hardware configurations for customer devices; controllers, etc. have been or will be illustrated, it should be noted that other implementations and hardware configurations are possible and no specific implementation or hardware configuration is needed. Therefore, many different types of implementations or hardware configurations can be used in the system 200 and with the method 100 and the methods disclosed herein are not limited to any specific hardware configuration for the system 200.

Software may be resident and operating or operational on the controller 202. The software may be stored on the data storage device 260 and may include some or all of the following: a control program 262 for operating the controller 202; a transaction input database 264 for storing information about transaction inputs received from a customer during the step 104; a transaction input database 266 for storing information related to a transaction, a customer, external events, or inputs not received from a customer during the step 104; a rule database 268 for storing information, rules, formulas, algorithms, methods, procedures, etc. regarding how one or more transaction inputs may be used to create or determine one or more transaction outputs or outcomes; a customer database 270 for storing information about one or more users or customers; a product/service database 272 for storing information regarding products or services; an entertainment interface database 274 for storing information, graphics, etc. for entertainment interfaces that may be presented during the step 108, and a transaction database 276 for storing information regarding sales, leases, etc. of products or services.

Each of the databases 264, 266, 268, 270, 272, 274 and 276 and their use and potential data structure will be discussed in more detail below. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Thus, those skilled in the art will understand that the number and content of the entries can be different from those illustrated herein. Not all of the databases 264, 266, 268, 270, 272, 274 and 276 will be used or needed in every embodiment of the method 100 or the system 200. Furthermore, some embodiments of the method 100 or the system 200 may use none or only some of the databases 264, 266, 268, 270, 272, 274 and 276. Of course, there may be embodiments of the method 100 or the system 200 where all of the databases 264, 266, 268, 270, 272, 274 and 276 are used.

The control program 262 may control the processor 250. The processor 250 preferably performs instructions of the control program 262, and thereby operates in accordance with the present invention, and particularly in accordance with the methods described in detail herein. The control program 262 may be stored in a compressed, uncompiled and/or encrypted format. The control program 262 furthermore includes program elements that may be necessary, such as an operating system, a database management system and device drivers for allowing the processor 250 to interface with peripheral devices, databases, etc. Appropriate program elements are known to those skilled in the art, and need not be described in detail herein. According to an embodiment of the present invention, the instructions of the control program 262 may be read into a main memory from another computer-readable medium, such as from a ROM or RAM. Execution of sequences of the instructions in the control program 262 causes the processor 250 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

As previously discussed above, the transaction input database 264 can be used to store information and data regarding transaction inputs received from customers during the step 104. The transaction input database 264 may be used, accessed, and/or updated by the controller 202, a customer device, or another device during the steps 104, 106 and/or 108. A tabular representation of a possible implementation of, or data structure for, the offer database 264 is illustrated in FIG. 4.

The transaction input database 264 preferably includes a transaction identifier field 300 which may contain identifiers or other identifying information for transactions associated with the transaction inputs stored or contained in the transaction input database 264, and one or more transaction fields, such as the transaction input fields 302, 304, 306 that may contain transaction inputs received during one or more implementations or occurrences of the step 104. In some embodiments, the transaction input database 264 may also include a date/time field to record or store the date/time for which one or more of the transaction inputs stored in the transaction input database 264 was received, computed, determined, etc.

Figure 4:
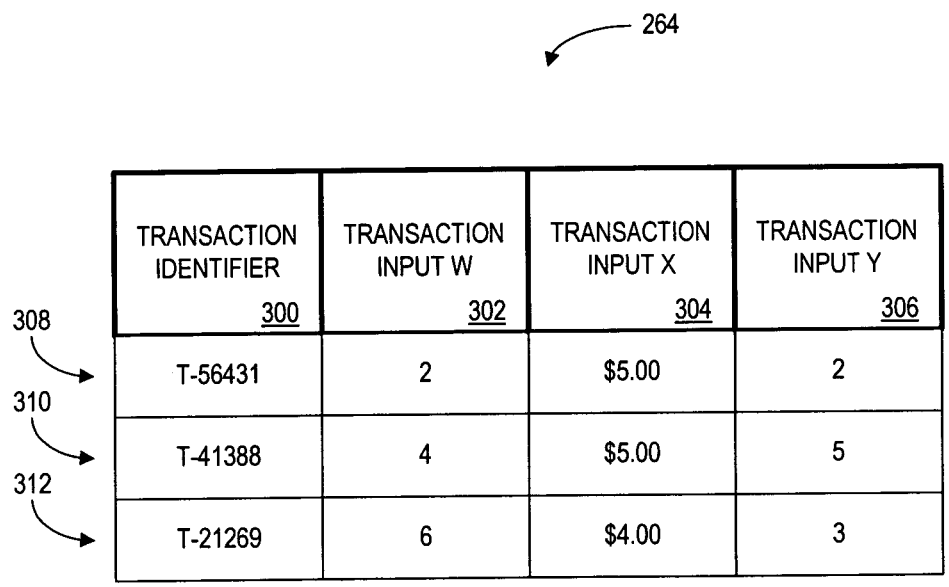
FIG. 4 is a tabular representation of a possible data structure for the transaction input database of FIG. 3.

While the transaction input database 264 illustrated in FIG. 4 provides information for three sets of transaction inputs 308, 310 and 312 identified by the transaction identifiers "T-56431," "T-41388" and "T-21269," respectively, in the transaction identifier field 300, there is no limit to the number or type of transaction inputs or transactions for which information can be stored in the transaction input database 264 and different fields may be used in the transaction input database 264.

As previously discussed above, the transaction input database 266 can be used to store information and data relating to a transaction, a user or customer, external events, etc. that are not received from a customer but from some other source during the step 104. Customer information may include customer buying history, preferences, characteristics, etc. The transaction input database 266 may be used, accessed, and/or updated by the controller 202, a customer device, or another device during the steps 102, 104, 106 and/or 108. A tabular representation of a possible implementation of, or data structure for, the transaction input database 266 is illustrated in FIG. 5. If desired, the transaction database 266 can be combined with the transaction database 264 or transaction database 266 and the transaction database 264 can be considered as a single database.

The transaction input database 266 preferably includes a transaction identifier field 350 which may contain identifiers or other identifying information for transactions associated with the transaction inputs stored or contained in the transaction input database 266, and one or more transaction fields, such as the transaction input fields 352, 354, 356 that may contain transaction inputs. In some embodiments, the transaction input database 266 may also include a date/time field to record or store the date/time for which one or more of the transaction inputs stored in the transaction input database 266 was received, computed, determined, etc.

While the transaction input database 266 illustrated in FIG. 5 provides information for three transaction inputs 358, 360 and 362 identified by the transaction identifiers "T-56431," "T-41388" and "T-21269," respectively, in the transaction identifier field 350, there is no limit to the number and type of transaction inputs for which information can be stored in the transaction input database 266 and different fields may be used in the transaction input database 266. Note that the three transactions "T-56431," "T-41388" and "T-21269" identified in the transaction database 266 are also identified in the transaction database 264.

As previously discussed above, the rule database 268 can be used to store information, rules, procedures, etc. regarding how one or more transaction inputs may be used to create one or more transaction outputs or outcomes. The rule database 268 may be used, accessed, and/or updated by the controller 202, a customer device, or another device during the steps 106 and/or 108. A tabular representation of a possible implementation of, or data structure for, the rule database 268 is illustrated in FIG. 6.

The rule database 268 preferably includes a rule identifier field 400 which may contain identifiers or other identifying information for transactions and rules, a rule condition field 402 which may contain information regarding how or when a rule might be selected or applied, and a rule result field 404 which may contain information regarding how an outcome is to be determined.

While the rule database 268 illustrated in FIG. 6 provides information for four rules 406, 408, 410 and 412 identified by the rule identifiers "R-3695," "R-1963," "R-2491" and "R-8680," respectively, in the rule identifier field 400, there is no limit to the number and type of rules for which information can be stored in the rule database 268 and different fields may be used in the rule database 268.

As previously discussed above, the customer database 270 can be used to store information and data regarding users, customers, etc. The customer database 270 may be used, accessed, and/or updated by the controller 202, a customer device, etc. during the steps 102, 104, 106 and/or 108. A tabular representation of a possible implementation of, or data structure for, the customer database 270 is illustrated in FIG. 7.

The customer database 270 preferably includes a customer identifier field 450 which may contain identifiers or other identifying information for users, customers, etc., a customer name field 452 which may contain name or other information for the customers identified in the field 450, a contact information field 454 which may contain contact information, such as email addresses, postal addresses, telephone numbers, facsimile numbers, etc., for the customers identified in the field 450, and a payment identifier field 456 which may contain information regarding a credit card account, financial account, or other payment identifier information for the customers identified in the field 450. In some embodiments, the customer database 270 may also include product or service preference information for the customers identified in the field 450 or other personal information about customers identified in the field 450.

Figure 7:
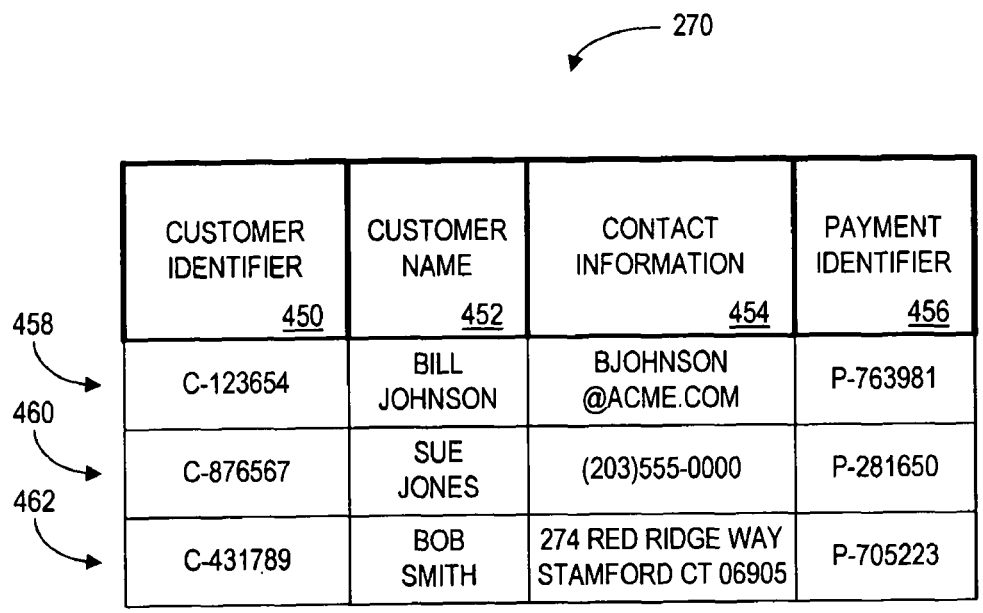
FIG. 7 is a tabular representation of a possible data structure for the customer database of FIG. 3.

While the customer database 270 illustrated in FIG. 7 provides information for three customers 458, 460 and 462 identified by the customer identifiers "C-123654," "C-876567" and "C-431789," respectively, in the customer identifier field 450, there is no limit to the number of customers for which information can be stored in the customer database 270 and different fields may be used in the customer database 270.

As previously discussed above, the product/service database 272 can be used to store information and data regarding products or services that may be purchased, rented, leased, etc. by a customer or user during a transaction. The product/service database 272 may be used, accessed, and/or updated by the controller 202, a customer device, or some other device during the steps 102, 104, 106 and/or 108. A tabular representation of a possible implementation of, or data structure for, the product/service database 272 is illustrated in FIG. 8.

The product/service database 272 preferably includes a product/service identifier field 500 which may contain identifiers or other identifying information products, services, etc., a seller, retailer, manufacturer, or supplier field 502 which may contain information regarding one or more sellers, retailers, manufacturers, or suppliers of the products or services identified in the field 500, and an internal price hurdle or lowest acceptable price field 504 which may contain information regarding the internal price hurdle for the products or services identified in the field 500 and/or the lowest price for which a product or service identified in the field 500 will or can be sold, rented, etc. If desired, the product/service database 272 may include other fields containing information regarding availability, expiration date, size, color, etc.

While the product/service database 272 illustrated in FIG. 8 provides information for three products 506, 508 and 510 identified by the product identifiers "PR-76-0952," "PR-23-7109" and "PR-41-9095," respectively, in the product/service identifier field 500, there is no limit to the number of products or services for which information can be stored in the product/service database 272 and different fields may be used in the product/service database 272.

Figure 9:
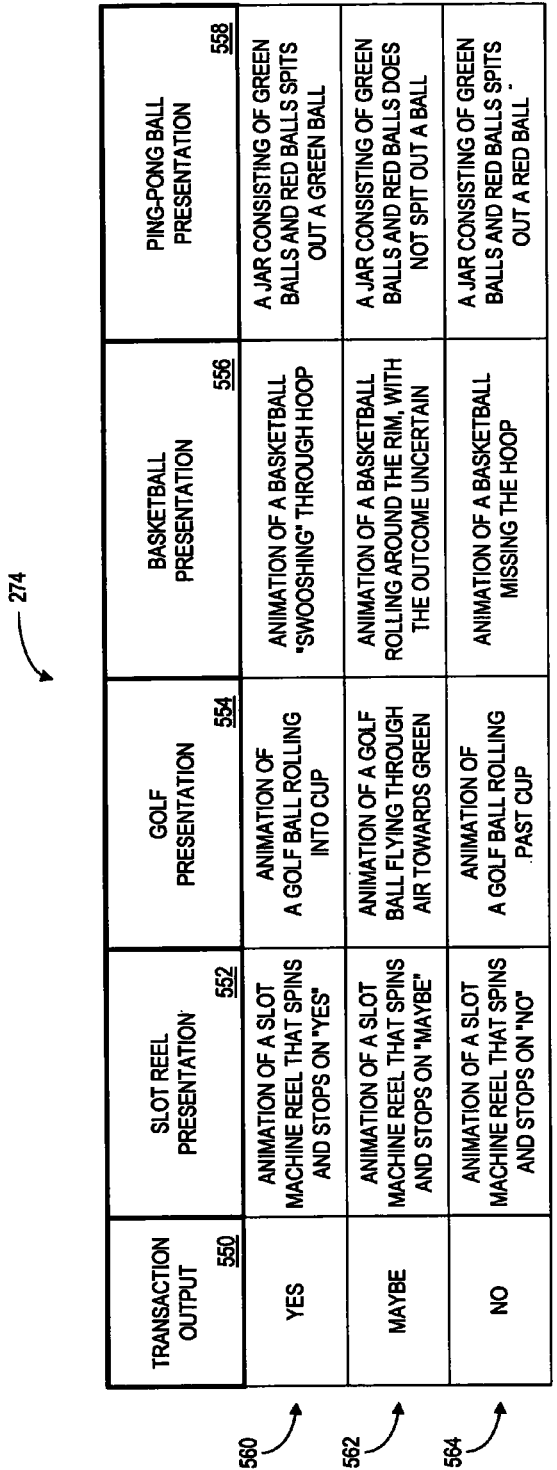
FIG. 9 is a tabular representation of a possible data structure for the entertainment interface database of FIG. 3.

As previously discussed above, the entertainment interface database 274 can be used to store information and data regarding entertainment interfaces, presentations, and other information. The entertainment interface database 274 may be used, accessed, and/or updated by the controller 202, a customer device, or some other device during the step 108. A tabular representation of a possible implementation of, or data structure for, the entertainment interface database 274 is illustrated in FIG. 9. Note that the entertainment interface database 274 illustrated in FIG. 9 is specifically directed to a transaction having an outcome or result of "YES," "NO" or "MAYBE" and an entertainment interface wherein a simulated or animated presentation related to a slot machine, golf, basketball, or a ping-pong ball is used. However, other transaction outcomes or results and entertainment interface presentations may also be used.

The entertainment interface database 274 illustrated in FIG. 9 includes a transaction result or outcome field 550 which may contain information regarding different possible transaction outcomes or results for one or more transactions determined during the step 106, a slot machine reel presentation field 552 which may contain information regarding how a simulated or animated slot machine will look or operate for the transaction outcomes provided in the field 550, a golf presentation field 554 which may contain information regarding how a simulated or animated golf shot will look or operate for the transaction outcomes provided in the field 550, a basketball presentation field 556 which may contain information regarding how a simulated or animated basketball will look or operate for the transaction outcomes provided in the field 550, and a ping-pong ball presentation field 558 which may contain information regarding how a simulated or animated selection of a ping-pong ball from a jar of ping-pong balls will look or operate for the transaction outcomes provided in the field 550.

Referring to FIG. 9, each of the four presentations or entertainment interfaces identified in the fields 552, 554, 556 and 558 may have a different result or effect for the transaction outcomes identified in the field 550 or will express the transaction outcomes in different ways. The entertainment interface preferably corresponds to the transaction outcome identified in the field 550 such that the transaction outcome is integrated with the entertainment interface. In addition, the transaction outcome determined during the step 106 may appear to a customer to be affected or controlled by the outcome of the entertainment interface, as opposed to appear to have been previously determined during the step 106.

While the entertainment interface database 274 illustrated in FIG. 9 provides information for three outcomes 560, 562 and 564 identified by the results "YES," "MAYBE," and "NO," respectively, in the result field 550, there is no limit to the number of outcomes and entertainment interfaces for which information can be stored in the entertainment interface database 274 and different fields may be used in the entertainment interface database 274.

Figure 10:
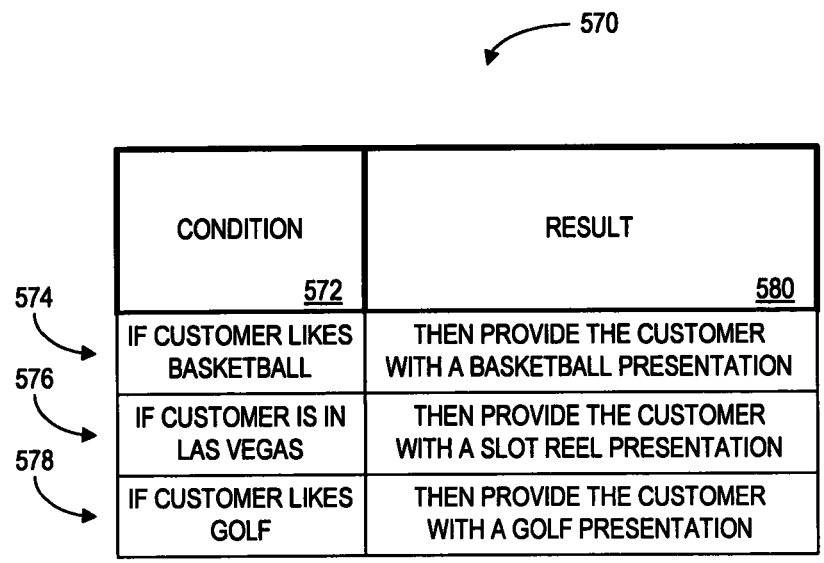
FIG. 10 is a tabular representation of a possible data structure for an entertainment interface selection database that may be used with the entertainment interface database of FIG. 9.

If desired, an entertainment interface selection database or corresponding fields may be used as part of, or in conjunction with, the entertainment interface database 550. An example entertainment interface selection database 570 is illustrated in FIG. 10 and includes a condition field 572 which may contain information regarding one or more queries, rules, conditions, etc. governing which of the entertainment interfaces stored in the entertainment interface database 550 is to be presented or displayed to a customer during the step 108. The entertainment interface selection database 570 illustrated in FIG. 10 includes information for three different conditions 574, 576, 578 directed to a customer's interest in basketball, a customer's location in Las Vegas, Nev., and a customer's interest in golf, respectively. The entertainment interface selection database 570 may also include a result or selection field 570 which may contain information regarding the outcome of the queries, rules, conditions, etc. provided in the field 572.

As previously discussed above, the transaction database 276 can be used to store information and data regarding transactions, transaction inputs, transaction outputs, etc. The transaction database 276 may be used, accessed, and/or updated by the controller 202, a customer device, or another device during the steps 102, 104, 106 and/or 108. A tabular representation of a possible implementation of, or data structure for, the transaction database 276 is illustrated in FIG. 11.

The transaction database 276 preferably includes a customer or customer identifier field 600 which may contain identifiers and other identifying information for users, customers, etc. initiating or otherwise conducting transactions, a transaction identifier field 602 which may contain identifiers and other identifying information for transactions initiated or otherwise conducted by the users, customers, etc. identified in the field 600, a transaction output field 604 which may contain one or more transaction outputs and other information generated or determined during the step 106, and an entertainment interface field 606 which may contain information regarding one or more entertainment interfaces provided or otherwise presented to a customer during the step 108.

While the transaction database 276 illustrated in FIG. 11 provides information for three transactions 608, 610 and 612 identified by the transaction identifiers "T-56431," "T-41388" and "T-21269," respectively, in the transaction identifier field 602, and three customers identified by the customer identifiers "C-34K34K," "C-FF34FF" and "C-F34FKK," respectively, in the customer identifier field 600, there is no limit to the number of transactions for which information can be stored in the transaction database 276 and different fields may be used in the transaction database 276.

Figure 12:
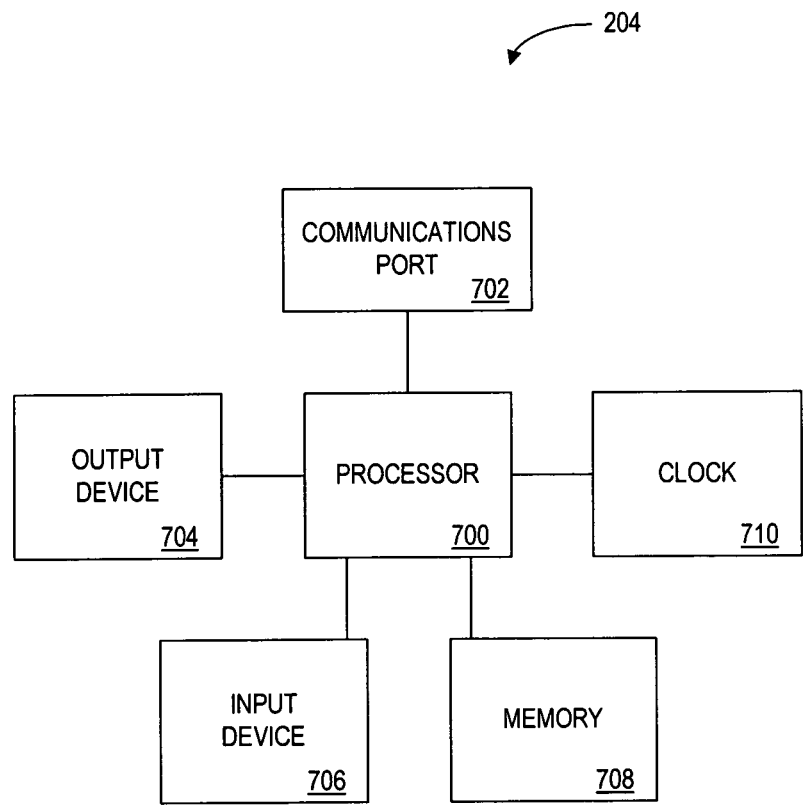
FIG. 12 is a block diagram illustrating a representative customer device of FIG. 2.

Now referring to FIG. 12, a representative block diagram of a customer device, such as the customer device 204, is illustrated. The customer device 204 may include a processor, microchip, or computer 700 that is in communication with or otherwise uses or includes one or more communication ports 702 for communicating with the controller 202 and/or with other devices. For example, the customer device 204 may have an infrared or other transmitter as one communication port to allow the customer device 204 to communicate with the controller 202. In addition, if the customer device 202 is connected to the controller 202 via an Ethernet local area network, the customer device 204 preferably will include an Ethernet adapter as a communication port to allow the customer device 204 to communicate with the controller 202.

The customer device 204 may include one or more output devices 704 for conveying information, such as a printer, audio speaker, infrared or other transmitter, antenna, display screen or monitor, text to speech converter, etc. to provide information, transaction interfaces, entertainment interfaces, transaction outputs to a customer, as well as one or more input devices 706 for receiving information, such as a bar code reader or other optical scanner, infrared or other receiver, antenna, magnetic stripe reader, image scanner, roller ball, touch pad, joystick, touch screen, microphone, computer keyboard, computer mouse, etc., to enable a customer to provide transaction inputs and other information to the customer device 204 and the system 200. A customer device 204 may include a voice recognition system or interactive voice response unit as an input device 706 to aid in receiving and processing transaction inputs and other information. The customer device 204 may also include a fingerprint scanner or reader, a retinal scanner, a voice analyzer, or other biometrics data input device as an input device 706 to allow the customer device 204 to receive transaction inputs and other information.

In addition to the above, the customer device 204 may include a memory or data storage device 708 to store information, software, databases, device drivers, customer information, customer identifications, transaction interfaces, entertainment interfaces, transaction outputs, transaction inputs, product or service information, etc. The memory or data storage device 708 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk.

The customer device 204 may also include an internal clock element 710 to maintain an accurate time and date for the customer device 204, create time stamps for information, transaction interfaces, entertainment interfaces, transaction inputs, transaction outputs, etc. generated or received via the customer device 204, etc.

As previously discussed above, possible customer devices include a personal computer, portable computer, workstation, mobile or fixed user station, network terminal or server, telephone, beeper, kiosk, dumb terminal, personal digital assistant, facsimile machine, etc. If desired, the customer device 204 may also function as the controller 202.

Now referring to FIGS. 13-20, an exemplary implementation or embodiment of the method 100 will now be discussed. The exemplary implementation or embodiment is directed to online transactions wherein a customer or user accesses a web site or web server to purchase gasoline. In addition, the transaction is implemented as a "name your own price" or conditional purchase offer transaction wherein the customer gets to provide a price quote or bid for gasoline and a list of one or more gas stations where the customer will be willing to purchase the gasoline for the customer's price bid. In such transactions, the customer is generally willing to exchange flexibility as to where the customer will purchase the gasoline and the brand of gasoline for a lower price for the gasoline. For example, a customer may state or otherwise indicate that the customer is willing to pay up to $1.55 a gallon for gas and that the customer is willing to purchase the gasoline at any one of three indicated gas stations for the $1.55 a gallon price. A customer's price bid or offer and list of acceptable gasoline stations are transaction inputs for the transaction. Other possible transaction inputs that may be provided by a customer include desired gasoline product description (e.g., regular, premium, high octane, etc.), the amount of gasoline in gallons, tank size, number of tanks of gasoline, etc. that the customer desires to purchase, and whether the customer will be using tokens, coupons, or other promotional items as part of the customer's payment for the gasoline. These transaction inputs preferably will be provided by the customer and received by a controller, customer device, or some other device during the step 104. Transaction inputs received during the step 104 from sources other than the customer may include the gasoline inventory of the customer's listed acceptable gas stations, any rebate offers or discounts provided directly by the customer's listed acceptable gas stations, etc.

These and additional transaction inputs for this example implementation of the method 100 will be discussed in further detail below.

Upon receipt of the transaction inputs for the gasoline during the step 104, a controller, customer device, or some other device preferably will determine if the customer's price offer or bid is acceptable during the step 106. That is, a controller, customer device, or some other device will determine if the customer can purchase the customer's desired amount of gasoline at the customer's desired price at one or more of the customer's stated acceptable gas station locations. The determined acceptance or rejection will constitute a transaction output. In addition, if the customer's offer is accepted and one of the customer's indicated acceptable gas stations is identified or selected for the customer during the step 106, such indication or selection also is a transaction output. These and additional transaction outputs for this example implementation of the method 100 will be discussed in further detail below.

The concept, operation and use of "name your own price" and conditional purchase offer transactions are further described in U.S. Pat. No. 5,794,207, in pending U.S. patent application Ser. No. 09/348,566 entitled SETTLEMENT SYSTEMS AND METHODS WHEREIN A BUYER TAKES POSSESSION AT A RETAILER OF A PRODUCT PURCHASED USING A COMMUNICATION NETWORK, pending U.S. patent application Ser. No. 09/337,906 entitled PURCHASING SYSTEMS AND METHODS WHEREIN A CUSTOMER TAKES POSSESSION AT A RETAILER OF A PRODUCT PURCHASED USING A COMMUNICATIONS NETWORK, pending U.S. patent application Ser. No. 09/388,723 entitled REDEMPTION SYSTEMS AND METHODS WHEREIN A CUSTOMER TAKES POSSESSION AT A RETAILER OF A PRODUCT PURCHASED USING A COMMUNICATIONS NETWORK, and in pending U.S. patent application Ser. No. 08/899,503 entitled SYSTEMS AND METHODS WHEREIN A BUYER PURCHASES A PRODUCT AT A FIRST PRICE AND ACQUIRES THE PRODUCT FROM A MERCHANT THAT OFFERS THE PRODUCT FOR SALE AT A SECOND PRICE, all of which are incorporated herein by reference.

Figure 13:
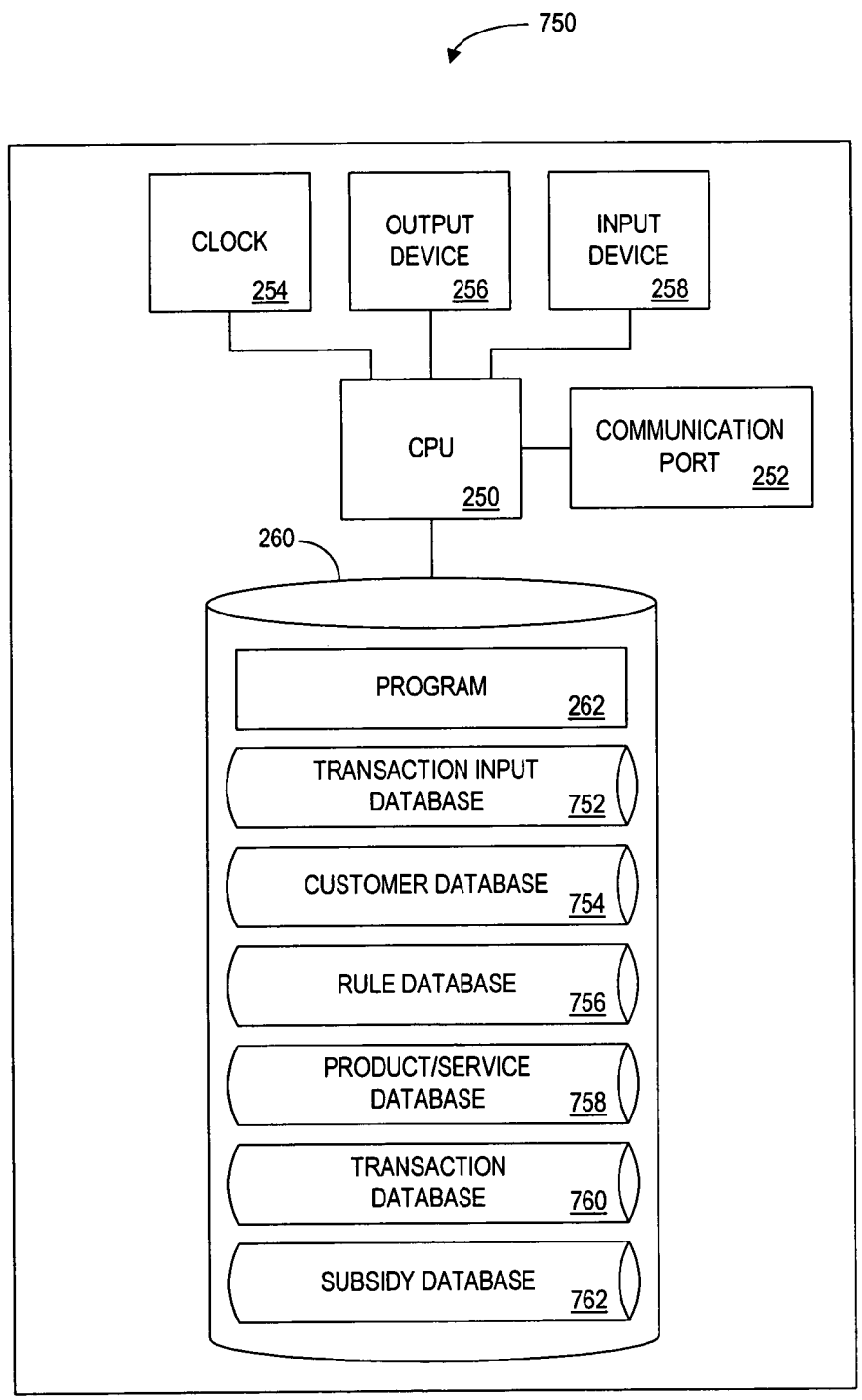
FIG. 13 is a block diagram illustrating another representative controller that can be used with the method of FIG. 1.

First referring to FIG. 13, another representative controller 750 usable with the method 100 and in the system 200 is illustrated. The controller 750 includes the processor or CPU 250, communication port 252, clock 254, output device 256, input device 258, memory or data storage device 260, and the control program 262 previously described above. In addition, the controller 750 includes a transaction input database 752, customer database 754, rule database 756, product/service database 758, a transaction database 760 and an entertainment interface or presentation database 274 that work in a manner similar to the databases described above. In addition, the controller 750 includes a subsidy database 762 which is a type of transaction input database. Each of the databases 752, 754, 756, 758 and 762 will be discussed in further detail below.

Now referring to FIG. 14, a tabular representation of a possible implementation of, or data structure for, the transaction input database 252 is illustrated. For purposes of this example implementation of the method 100, the transaction inputs from a customer include a type of gasoline, a price bid or offer, whether or not a token is used as part of the customer's payment, a list of gas stations acceptable to the customer to purchase the gasoline, the gas tank size of the customer's vehicle and the desired number of gas tank fills that the customer desires to purchase. Therefore, the transaction input database 752 includes a transaction/offer identifier field 780 to identify specific customer transactions, a product identifier field 782 to identify specific gasoline products selected by customers, a price bid or offer field 784 to identify the desired price bids made by customers for the gasoline products identified in the field 782, a token use field 786 to identify if a token is used as part of the payment made by a customer for the gasoline products identified in the field 782, an acceptable gas stations field 788 that lists one or more gas stations acceptable to the customer or desired by the customer for the gasoline products identified in the field 780, a vehicle tank size field 790, and a number of tanks of gas field 792 for which customers desire to purchase the products identified in the field 782 for the price specified in the field 784. The transaction inputs will be received from customers by the controller 750, a customer device, or some other device during one or more implementations of the step 104 in response to a transaction interface provided to the customers during one or more implementations of the step 102 that requests or requires that the customer provide the transaction inputs. All of the transaction inputs from a customer that are received during the step 104 can be deemed to be the customer's transaction offer.

The transaction input database field 752 illustrated in FIG. 14 includes information for three transactions 794, 796, 798 identified by the transaction identifiers "T-31292," "T-31416" and "T-31738," respectively. The transaction inputs for the transaction "T-31292" indicate that a customer desires to purchase "89 OCTANE GRADE GASOLINE" for $1.53 a gallon at either one of the two gas stations identified in the field 788. Furthermore, the customer desires to purchase fifty tanks of gasoline for his or her vehicle, which contains a twelve gallon tank. As indicated by the entry in the field 786 for the transaction identified as "T-31292," the customer will not be using a token, coupon, or other promotional item as part of payment for the gasoline. The transaction inputs for the transaction "T-31738" indicate that a customer desires to purchase "91 OCTANE GRADE GASOLINE" for $1.25 a gallon at either one of the two gas stations identified in the field 788. Furthermore, the customer desires to purchase one tank of gasoline for his or her vehicle, which contains a twelve gallon tank. As indicated by the entry in the field 786 for the transaction identified as "T-31738," the customer does want to use a token, coupon, or other promotional item as part of payment for the gasoline.

Figure 15:
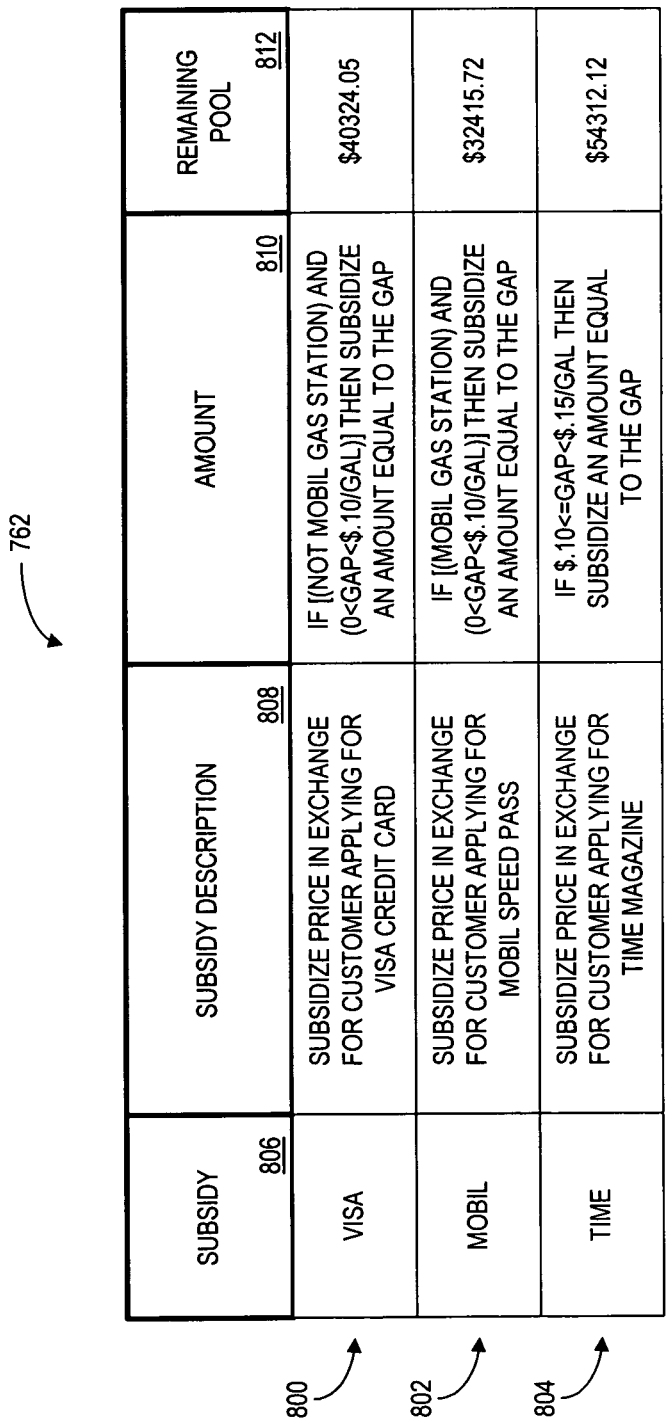
FIG. 15 is a tabular representation of a possible data structure for the subsidy database of FIG. 13.

Now referring to FIG. 15, a tabular representation of a possible implementation of, or data structure for, the subsidy database 762 is illustrated. For purposes of this example implementation of the method 100, the transaction inputs include information as to whether a subsidy exists that can be used to provide a lower price for gasoline sold to customers or to augment a customers price bid provided by the customer as a transaction input. For example, if a customer provides a price bid of $1.35 per gallon as a transaction input and a subsidy exists that would allow the customer's effective price bid to be increased by up to ten cents per gallon, the customer's effective price bid is $1.45 per gallon, thereby increasing the chance that the customer's transaction offer will be accepted.

The subsidy database 762 illustrated in FIG. 15 includes information for three subsidies 800, 802, 804 being provided by "VISA," "MOBIL" and "TIME," respectively, as identified in the subsidy identifier or name field 806. The subsidy database 762 also includes a subsidy description field 808 which contains information regarding the type and operation of subsidies, an amount field 810 which contains information regarding the operation and use of the subsidies, and a remaining pool field 812 which contains information regarding the monetary amount of the subsidy left remaining.

As illustrated by the entries in the fields 808, 810, 812 for the "VISA" subsidy 800, a subsidy will be provided if a customer applies for a credit card and if the customer is purchasing the gasoline at a Mobil gas station under certain conditions. More specifically, if a customer will apply for a credit card and if the gap between the customer's price bid per gallon of gasoline and the price for which the gasoline can be sold is less than ten cents, a subsidy will be provided to the customer equal to the gap between the customer's price bid per gallon of gasoline and the price for which the gasoline can be sold. The remaining amount of subsidy money is $40,324.50.

As illustrated by the entries in the fields 808, 810, 812 for the "TIME" subsidy 804, a subsidy will be provided if a customer applies for a subscription to Time Magazine under certain conditions. More specifically, if a customer applies for a subscription to Time Magazine and if the gap between the customer's price bid per gallon of gasoline and the price for which the gasoline can actually be sold is less than fifteen cents but greater than or equal to ten cents, a subsidy will be provided to the customer equal to the gap between the customer's price bid per gallon of gasoline and the price for which the gasoline can be sold. The remaining amount of subsidy money is $54,312.12.

Now referring to FIG. 16, a tabular representation of a possible implementation of, or data structure for, the customer database 754 is illustrated. The customer database 754 includes information for three customers 820, 822, 824 identified as "ANDY," "SCOTT" and "JAMES," respectively in a customer identifier field 826. The customer database 754 includes a field 828 which contains information regarding how many times the customers identified in the field 826 have visited the web site or server conducting the gasoline purchase transaction, a dollar value to date field 830 which contains information regarding how much money the customers identified in the field 826 have spent on gasoline purchase transactions, a financial account identifier field 834 which contains credit card, debit card, or other financial account information for the customers identified in the field 826, a token balance field 836 which contains information regarding how many tokens are possessed or usable by each customer identified in the field 826, and a target brand identifiers field 838 which contains information regarding brand preferences of customers, indications of the product brands previously supplied to customers, etc.

Now referring to FIG. 17, a tabular representation of a possible implementation of, or data structure for, the rule database 756 is illustrated. The rule database 756 includes information for three rules 840, 842, 844 as described in a condition field 846 and a result field 848. As previously discussed above, one or more rules preferably are applied during the step 106 to the transaction inputs received during the step 104 to create or determine one or more transaction outputs.

As illustrated by the information in the fields 846 and 848 for the rule 840, an offer may be made to a customer by a controller during a transaction may allow the customer to effectively increase the customer's bid price per gallon of gasoline or to otherwise increase the chances of the customer's transaction offer being accepted. For example, in situations where a Visa credit card cross subsidy has been selected for potential offer to a customer and the customer is trying to purchase "89 OCTANE GRADE GAS" during a transaction, if the difference between the customer's price bid per gallon of gasoline and the internal price hurdle for the gasoline is zero or less, i.e., the customer's price bid meets or exceeds the internal price hurdle for the gasoline, the customer's transaction offer is accepted. If, on the other hand, the difference between the customer's price bid per gallon of gasoline and the internal price hurdle for the gasoline is greater than zero but less than ten cents per gallon, i.e., the customer's price bid is less than the internal price hurdle for the gasoline but is not more than ten cents less, the customer will be offered an opportunity to accept the Visa credit card cross subsidy. Therefore, if the customer accepts the Visa credit card cross subsidy and applies for a credit card, the customer's transaction offer will be accepted. If, however, the customer does not accept the Visa credit card cross subsidy, the customer's transaction will not be accepted. In the situation where the difference between the customer's price bid per gallon of gasoline and the internal price hurdle for the gasoline is greater than ten cents per gallon, the customer's transaction offer is rejected. The determination of whether to offer the Visa credit cross subsidy of rule 840, the Mobil cross subsidy of rule 842, or the Time Magazine cross subsidy of rule 844 may be determined by another rule, a transaction input, etc. The concept, operation and use of cross subsidies are described in pending U.S. patent application Ser. No. 09/274, 281 entitled METHOD AND APPARATUS FOR PROVIDING CROSS-BENEFITS VIA A CENTRAL AUTHORITY, and U.S. patent application Ser. No. 09/282,747, entitled METHOD AND APPARATUS FOR PROVIDING CROSS-BENEFITS BASED ON A CUSTOMER ACTIVITY, all of which are incorporated herein by reference.

Now referring to FIG. 18, a tabular representation of a possible implementation of, or data structure for, the product/service database 758 is illustrated. The product/service database 758 includes information for three products 860, 862, 864 identified as "89 OCTANE GRADE GASOLINE," "89 OCTANE GRADE GASOLINE" and "91 OCTANE GRADE GASOLINE," respectively, in the product identifier field 866. The product/service database 758 also includes a gas station field 868 listing or describing one or more gas stations or other locations at which the gasoline products listed in the field 866 may be purchased or found. In addition, the product/service database 758 includes an internal price hurdle or lowest acceptable price field 870 which contains information regarding the lowest price at which the gasoline products identified in the field 866 can be purchased at the gas stations listed or described in the field 868. An internal price hurdle or lowest acceptable price for a product may be set by a manufacturer, a supplier, a specific retailer, controller, customer device, etc. and may vary between manufacturers, suppliers, retailers, etc.

As a further description of the operation and use of the controller 750 and the databases 752, 754, 756, 758 and 762, assume that a customer has provided the transaction inputs in the transaction input database for the transaction identified as "312" in the transaction database 752 illustrated in FIG. 14. Therefore, the customer is offering to pay $1.53 a gallon for "89 OCTANE GRADE GAS" gasoline at a Mobil gas station and a Shell gas station. As shown in the product database 758 illustrated in FIG. 18, "89 OCTANE GRADE GAS" is available at both of customer's desired gas stations. However, the internal price hurdle or lowest acceptable price of $1.56 per gallon of "89 OCTANE GRADE GAS" at both gas stations is three cents higher than the customer is willing to pay. In order to enable the customer to purchase the customer's desired gasoline at the customer's desired price at the customer's desired location, the controller 750 may determine if a subsidy can be used to lower the effective internal price hurdle of the gasoline or to raise the effective price bid made by the customer. For example, a reference to the subsidy database 762 illustrated in FIG. 15 shows that a Visa cross subsidy can be used or applied if the gasoline is not purchased at a Mobil gas station and the customer is willing to apply for a Visa credit card or a Mobil cross subsidy which can be used or applied if the gasoline is purchased at a Mobil gas station and the customer is willing to purchase a Mobil speed pass. Thus, by using either one of these cross subsidies, the customer's effective price bid can be raised three cents to $1.56 to meet the internal price hurdle for the "89 OCTANE GRADE GAS" that the customer desires to purchase. The controller 750 can decide which of the cross subsidies to offer the customer and the customer's response becomes a transaction input. The selection between available subsidies may be based on a variety of factors, including size of remaining subsidy balance, customer preference, etc. If the customer is "Andy" as indicated in the customer database 754, the customer is known to prefer "SHELL" gasoline or it is otherwise desired or economical to provide "SHELL" gasoline to the customer (e.g., perhaps the customer obtained "SHELL" gasoline on a previous transaction and it is desired to provide consistent transaction results to customers or to attempt to lock in a brand preference with the customer), therefore the Visa cross subsidy may be chosen by the controller 750 to be offered to the customer. If the customer is "James" as indicated in the customer database 754, the customer is known to prefer "MOBIL" gasoline or it is otherwise desired or economical to provide "MOBIL" gasoline to the customer, therefore the Mobil cross subsidy may be chosen by the controller 750 to be offered to the customer. The determination of an acceptance of the customer's transaction offer is determined during the step 106.

Now referring to FIG. 19, a tabular representation of a possible implementation of, or data structure for, the transaction database 760 is illustrated. The transaction database 760 includes information for three users or customers 880, 882, 884 identified as "ANDY," "SCOTT" and "JAMES" in a customer identifier field 886, each of which has initiated, conducted or otherwise participated in a transaction identified as "T-31214," "T-76553" and "T-78924," respectively, in a transaction identifier field 888. In addition, each of the three transactions "T-31214," "T-76553" and "T-78924," has at least one transaction output indicated in a transaction outputs field 890 and a corresponding entertainment interface indicated in an entertainment interface field 892. For example, the customer "ANDY" is associated with the transaction "T-31214" for which a "YES" transaction output and a "MAYBE" transaction output have been determined during the step 106. During the step 108, the two transaction outputs "YES" and "MAYBE" will be integrated into, or provided to the customer "ANDY" via an entertainment interface using or including two simulated slot machine reels, one reel of which stop on "YES" and the other reel of which will stop on "MAYBE."

As shown by this example, a transaction interface is provided or otherwise presented to a customer during the step 102, one or more transaction inputs are received from the customer during the step 104, and one or more transaction outputs are determined during the step 106. During the step 108, the transaction output(s) preferably are presented to the customer via an entertainment interface. For example, a transaction output for the gasoline purchase described above may be presented in the form of a simulated slot machine reel, the possible transaction outcomes provided on the reel being "YES," "NO" and "MAYBE," as illustrated by the three positions 900, 902, 904 in FIG. 20 of the simulated slot machine reel. Thus, the simulated slot machine reel is or comprises at least part of the entertainment interface provided during the step 108 and the stopping of the simulated slot machine reel on "YES," "NO" or "MAYBE" provides the transaction outcome for the transaction in accordance with the transaction outcome determined during the step 106. Therefore, the presentation or delivery of the transaction outcome is integrated into, or provided in conjunction with, the entertainment interface such that the entertainment provided via the entertainment interface is not completed until the presentation or display of the transaction outcome. In addition, while the transaction outcome preferably is determined during the step 106 and prior to the presentation or completion of the entertainment interface during the step 108, a customer viewing the entertainment interface may believe that the transaction outcome has not been determined until the entertainment interface is completed or that the transaction outcome has been determined randomly or in accordance with a rule different than the actual rule(s) applied during the step 106 to determine the transaction outcome. Thus, should the customer received a negative or undesired transaction outcome, the customer may not associate the transaction outcome with or otherwise blame the controller 750 or the entity implementing the method 100 or the apparatus 200. The duration of the entertainment interface may be fixed, random, or variable depending on one or more transaction inputs, one or more transaction outputs, etc. A transaction output of "YES" may indicate that a transaction input or transaction offer received during the step 102 have been accepted or are acceptable while a transaction output of "NO" may indicate that transaction inputs or transaction offers received during the step 104 have not been accepted or are not acceptable. A transaction output of "MAYBE" may indicate that transaction inputs or transaction offers received during the step 104 might be accepted if the customer accepted a cross subsidy offer, such as the Visa credit card offer, Mobil speed pass offer, or subscription to Time Magazine offer, or increased his or her price bid for the gasoline.

Figure 21:
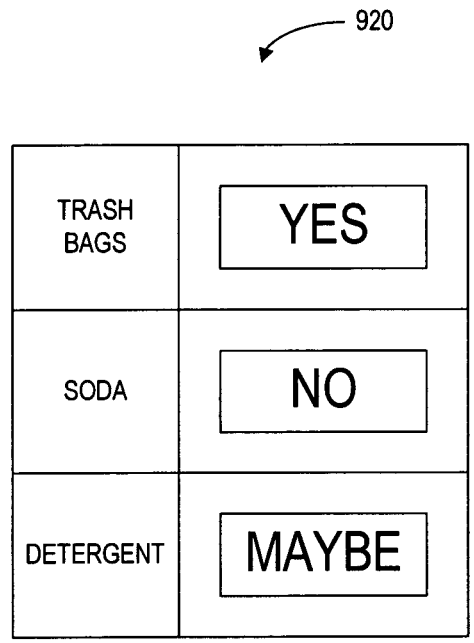
FIG. 21 is another illustration of a possible entertainment interface that can be used with the entertainment interface database of FIG. 3.

In embodiments or transactions where multiple transaction outputs may occur, a simulated slot machine reel or reels may be used during or as part of an entertainment interface to indicate multiple "YES," "NO" or "MAYBE" transaction outputs, such as in the entertainment interface or presentation 920 illustrated in FIG. 21 for a transaction for grocery items where a customer is trying to purchase trash bags, soda, and detergent. The transaction outputs in the entertainment interface 920 show that the customer's transaction offer has been accepted for trash bags; rejected for soda, and is a "MAYBE" for detergent. The transaction output of "MAYBE" may indicate that a customer's transaction offer for detergent might be accepted if the customer accepted a cross subsidy offer or increased his or her price bid for the detergent. Thus, the presentation or delivery of the transaction outcomes is integrated into or with the presentation or delivery of the entertainment interface.

Figure 22:
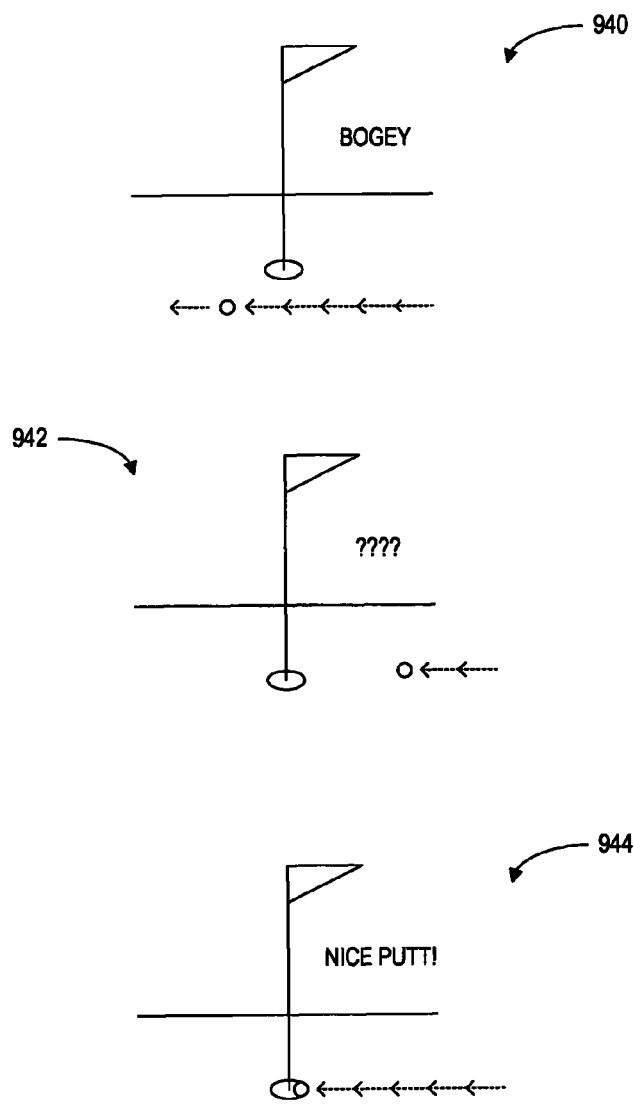
FIG. 22 is another illustration of a possible entertainment interface that can be used with the entertainment interface database of FIG. 3.

As another example of embodiments or transactions where multiple transaction outputs may occur or be possible, a golf related entertainment interface may be used to indicate a rejection of a transaction offer, an acceptance of a transaction offer, or a situation where the transaction output is "MAYBE" or unclear, as illustrated in FIG. 22. For example, if a transaction output of "NO" or a rejection of transaction offer is determined during the step 106, such transaction output may be indicated by showing a golf ball roll by a hole without going in, as illustrated in golf ball putting scenario 940. Alternatively, if a transaction output of "MAYBE" is determined during the step 106, such transaction output may be indicated by showing a golf ball rolling towards a hole but not reaching the hole, as illustrated in golf ball putting scenario 942. Further, if a transaction output of "YES" or an acceptance of transaction offer is determined during the step 106, such transaction output may be indicated by showing a golf ball rolling into a hole, as illustrated in golf ball putting scenario 944.

Figure 23:
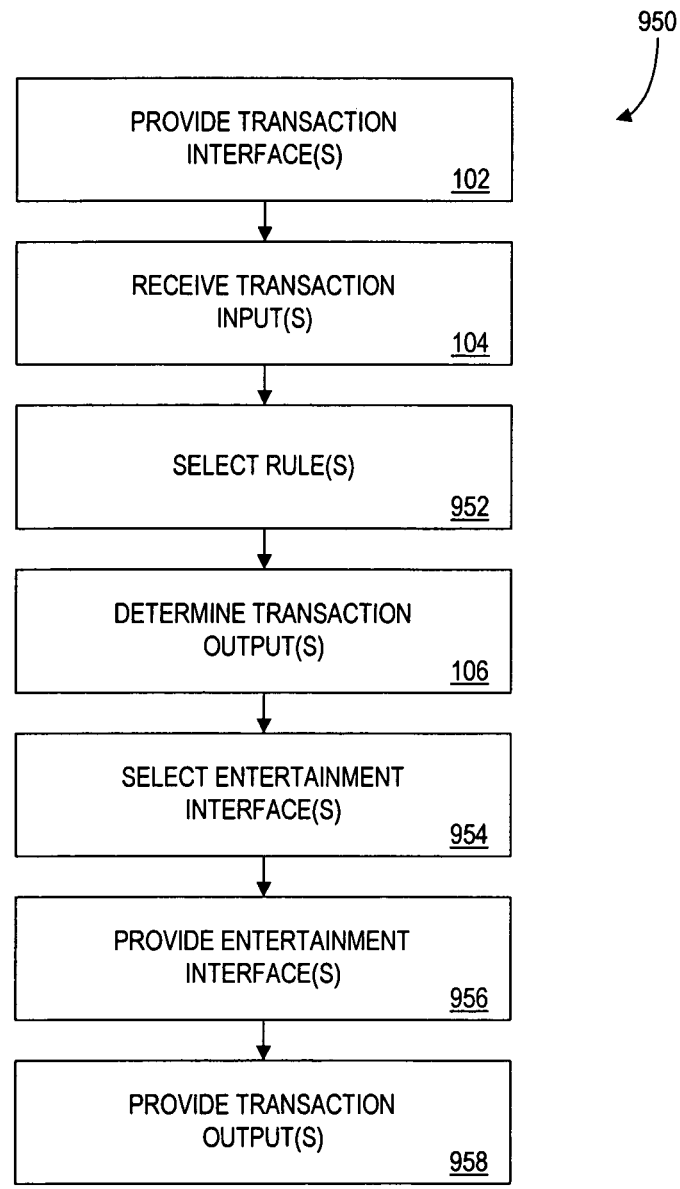
FIG. 23 is a flowchart of a second embodiment of a method in accordance with the present invention.

Now referring to FIG. 23, a second embodiment 950 of a method in accordance with the present invention is illustrated. The method 950 includes the steps 102, 104 and 106 as previously discussed above. In addition, the method 950 includes a step 952 during which one or more rules are identified or selected to apply to one or more of the transaction inputs received during the step 104 and which will be used, along with one or more of the transaction inputs to determine one or more transaction outcomes during the step 106. The method 950 also includes a step 954 during which one or more entertainment interfaces are identified or selected, such as one of the entertainment interfaces from the entertainment interface database 274 previously described above. If desired, the steps 106 and 954 may be performed in the opposite order or combined as single step. During steps 956 and 958, the entertainment interface(s) selected during the step 954 and the transaction outcome(s) determined during the step 106 are presented or otherwise provided, in a manner similar to the step 108 previously described above, preferably in a manner such that the entertainment interface and transaction outputs are provided in an integrated manner. If desired, the steps 956 and 958 can be combined or otherwise treated as a single step so that the entertainment interface(s) selected during the step 954 and the transaction outcome(s) determined during the step 106 may be presented simultaneously or in an integrated manner.

The foregoing description is considered as illustrative only of the principles of the invention. Furthermore, since numerous modifications and changes will readily occur to those skilled in the art, it is not intended to limit the invention to the exact construction and process shown and described above. Accordingly, all suitable modifications and equivalents may be deemed to fall within the scope of the invention as defined by the claims which follow. Further, even though only certain embodiments have been described in detail, those having ordinary skill in the art will certainly understand that many modifications are possible without departing from the teachings thereof. All such modifications are intended to be encompassed within the following claims.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. In addition, many, if not all, of the steps for the methods described above are optional or can be combined or performed in one or more alternative orders or sequences without departing from the scope the present invention and the claims should not be construed as being limited to any particular order or sequence, unless specifically indicated.

While specific implementations and hardware configurations for controllers and customer devices have been illustrated, it should be noted that other implementations and hardware configurations are possible and that no specific implementation or hardware configuration is needed. Therefore, many different types of implementations or hardware configurations can be used in the systems 200 and with the methods 100, 950 and the methods disclosed herein are not limited to any specific hardware or software configuration.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions, or code. The computer software, program, sets of instructions, code can be storable, writeable, or savable on any computer usable or readable media or other program storage device or media such as a floppy or other magnetic or optical disk, magnetic or optical tape, CD-ROM, DVD, punch cards, paper tape, hard disk drive, Zip™ disk, flash or optical memory card, microprocessor, solid state memory device, RAM, EPROM, or ROM.

The term "computer-readable medium" as used herein refers to any medium that directly or indirectly participates in providing instructions to a processor for execution. Such a medium may take many forms, including but not limited to, non-volatile media, volatile media, and transmission media. Non-volatile media include, for example, optical or magnetic disks. Volatile media include dynamic random access memory (DRAM), which typically constitutes the main memory. Transmission media include coaxial cables, copper wire and fiber optics, including the wires that comprise a system bus coupled to a processor. Transmission media can also take the form of acoustic, electrical or electromagnetic waves, such as those generated during radio frequency (RF) and infrared (IR) data communications.

The connections or communications between customer devices, controllers, etc. discussed herein are only meant to be generally representative of cable, computer, telephone, or other communication or data networks and methods for purposes of elaboration and explanation of the present. The connections are also intended to be representative of, and include all or a part of, the Internet, the World Wide Web, and other privately or publicly operated networks, including wide area networks, local area networks, data communication networks or connections, intranets, routers, satellite links or networks, microwave links or networks, cellular telephone or radio links, fiber optic transmission lines, ISDN lines, T1 lines, DSL, etc. In addition, as used herein, the terms "computer," "customer device," "terminal," "client," "device" and "client device" are generally interchangeable and are meant to be construed broadly and to include, but not be limited to, all clients, client devices or machines, personal digital assistants and palm top computers, cash registers, terminals, computers, point-of-sale devices, processors, servers, etc. connected or connectable to a computer or data communications network and all devices on which Internet-enabled software, such as the NETSCAPE COMMUNICATOR™ or NAVIGATOR™ browsers, MOSIAC™ browser, or MICROSOFT INTERNET EXPLORER™ browsers, can operate or be run. The term "browser" should also be interpreted as including Internet-enabled software and computer or client software that enables or allows communication over a computer network and Internet-enabled, monitored, or controlled devices such as WebTV™ devices, household appliances, phones, etc.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

The embodiments of the invention in which an exclusive property or privilege is claimed are defined as follows:

1. A method for conducting a transaction, comprising:
   receiving at least one transaction input from a customer in accordance with a transaction interface previously provided to said customer;
   determining at least one transaction output according to at least one rule; and
   providing at least one of said at least one transaction outputs in such a manner that said at least one transaction output appears to have been determined randomly,
   wherein said providing at least one of said at least one transaction outputs in such a manner that said at least one transaction output appears to have been determined randomly includes integrating said at least one of said at least one transaction outputs into a display of at least one simulated slot machine reel.

2. A method for conducting a transaction, comprising:
   receiving at least one transaction input from a customer in accordance with a transaction interface previously provided to said customer;

determining at least one transaction output according to a first rule; and providing at least one of said at least one transaction outputs in such a manner that said at least one transaction output appears to have been determined according to a second rule different from said first rule, wherein said providing of said at least one of said at least one transaction outputs in such a manner that said at least one transaction output appears to have been determined according to a second rule includes integrating said at least one of said at least one transaction outputs into a display of at least one simulated slot machine reel.

3. A method for conducting a transaction, comprising:

receiving at least one transaction input from a customer in accordance with a transaction interface previously provided to said customer;

determining at least one transaction output according to at least one rule; and providing at least one of said at least one transaction outputs in such a manner that said at least one transaction output appears to have been determined in a manner other than in accordance with said at least one rule, wherein said providing at least one of said at least one transaction outputs in such a manner that said at least one transaction output appears to have been determined according in a manner other than in accordance with said at least one rule includes integrating said at least one of said at least one transaction outputs into a display of at least one simulated slot machine reel.

\* \* \* \* \*